(12) United States Patent
Takasugi et al.

(10) Patent No.: US 8,533,472 B2
(45) Date of Patent: Sep. 10, 2013

(54) TERMINAL IDENTIFICATION METHOD, AUTHENTICATION METHOD, AUTHENTICATION SYSTEM, SERVER, TERMINAL, WIRELESS BASE STATION, PROGRAM, AND RECORDING MEDIUM

(75) Inventors: Koichi Takasugi, Tokyo (JP); Koki Mitani, Tokyo (JP); Hiroshi Saito, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 354 days.

(21) Appl. No.: 12/952,321

(22) Filed: Nov. 23, 2010

(65) Prior Publication Data

US 2011/0072121 A1 Mar. 24, 2011

Related U.S. Application Data

(62) Division of application No. 11/885,518, filed as application No. PCT/JP2006/325258 on Dec. 19, 2006.

(30) Foreign Application Priority Data

Dec. 19, 2005 (JP) .................................. 2005-364522
May 1, 2006 (JP) .................................. 2006-127546

(51) Int. Cl.
*H04L 9/32* (2006.01)
(52) U.S. Cl.
USPC .......................................... 713/169; 713/168
(58) Field of Classification Search
None
See application file for complete search history.

(56) References Cited

U.S. PATENT DOCUMENTS 5,751,812 A * 5/1998 Anderson ...................... 713/155
6,058,480 A 5/2000 Brown
(Continued)

FOREIGN PATENT DOCUMENTS

EP 1 528 707 A2 5/2005
EP 1 603 269 A1 12/2005
(Continued)

OTHER PUBLICATIONS

Miyako Ohkubo, et al., "Forward-secure RFID Privacy Protection for Low-cost RFID", Computer Security Symposium 2003, Ronbunshu, Shadan Hojin Information Processing Society of Japan, Oct. 29, 2003, pp. 491-496.

(Continued)

*Primary Examiner* — Peter Poltorak
(74) *Attorney, Agent, or Firm* — Harness, Dickey & Pierce, P.L.C.

(57) ABSTRACT

A terminal identification method is provided which enables two-way communications between terminals and a network while identifying terminal IDs and protecting privacy. Also, authentication method and system are provided which require no complicated calculating process, less steps and smaller amount for wireless communications, and less power consumption. A server and terminal share a hash function and an initial value determined for each terminal, calculate the same temporary ID by hashing the initial value the same number of times with the hash function, and identify the terminal using the calculated temporary ID. The server and the terminal also hold a common hash function and authentication information, acquire an authenticating communication parameter from communication parameters temporarily common during communication, and generate an authentication key using the authentication information, the authenticating communication parameter, and the hash function. Then at least one of the server and terminal performs authentication using the generated authentication key.

14 Claims, 20 Drawing Sheets

(56) References Cited

U.S. PATENT DOCUMENTS

| | | | |
|---|---|---|---|
| 6,711,400 B1 | 3/2004 | Aura | |
| 7,661,132 B2* | 2/2010 | Ohkubo et al. | 726/18 |
| 7,734,280 B2 | 6/2010 | Eastlake, III | |
| 7,929,705 B2* | 4/2011 | Kim et al. | 380/278 |
| 2002/0012433 A1 | 1/2002 | Haverinen et al. | |
| 2003/0046572 A1* | 3/2003 | Newman et al. | 713/193 |
| 2003/0110381 A1* | 6/2003 | Aoshima et al. | 713/168 |
| 2004/0123104 A1* | 6/2004 | Boyen et al. | 713/165 |
| 2005/0010788 A1* | 1/2005 | Craft | 713/187 |
| 2005/0097325 A1 | 5/2005 | Morris et al. | |
| 2005/0182935 A1 | 8/2005 | Morris et al. | |
| 2005/0289082 A1 | 12/2005 | Morris et al. | |
| 2006/0080732 A1* | 4/2006 | Ohkubo et al. | 726/9 |
| 2006/0094401 A1 | 5/2006 | Eastlake, III | |
| 2006/0129805 A1* | 6/2006 | Kim et al. | 713/158 |
| 2006/0168253 A1 | 7/2006 | Baba et al. | |
| 2007/0033393 A1* | 2/2007 | Ganesan et al. | 713/155 |
| 2007/0186105 A1* | 8/2007 | Bailey et al. | 713/168 |
| 2008/0162936 A1* | 7/2008 | Haddad | 713/171 |
| 2009/0141891 A1* | 6/2009 | Boyen et al. | 380/44 |

FOREIGN PATENT DOCUMENTS

| | | |
|---|---|---|
| EP | 1 669 877 A1 | 6/2006 |
| JP | 2003-110628 A | 4/2003 |
| JP | 2004-274429 A | 9/2004 |
| JP | 2004014113 * | 2/2005 |
| JP | 2005-137011 A | 5/2005 |
| JP | 2005-167670 A | 6/2005 |
| JP | 2005-339238 A | 12/2005 |
| JP | 2006-186903 A | 7/2006 |
| WO | 2004/082205 A1 | 9/2004 |
| WO | 2005/031579 A1 | 4/2005 |
| WO | 2006/009040 A1 | 1/2006 |

OTHER PUBLICATIONS

Shingo Kinoshita, et al., "Nonidentifiable Anonymous-ID Scheme for RFID Privacy Protection," ("RFID Privacy Hogo o Jitsugen suru Kahen Hitoku ID Hoshiki"), Computer Security Symposium 2003, Ronbunshu, Shadan Hojin Information Processing Society of Japan, Oct. 29, 2003, pp. 497-502.

Isao Miyake, et al., "Ubiquitous service network technology", Future Network Series, ISBN 4885499186, Sep. 2003, pp. 226-233 (translation of pp. 228-229).

Bruce Schneier, "Applied Cryptography," Second Edition, John Wiley & Sons, Inc., 1996, pp. 52-56, 429-459.

* cited by examiner

FIG. 3

| PERMANENT ID | TEMPORARY ID | TEMPORARY ID POINTER | NUMBER OF HASHING OPERATIONS | TEMPORARY ID | TEMPORARY ID POINTER | NUMBER OF HASHING OPERATIONS | TEMPORARY ID UPDATING TIME | HASH SEED | INITIAL HASH SEED | TEMPORARY ID FOR INITIALIZATION |
|---|---|---|---|---|---|---|---|---|---|---|
| 0001 | 35AD39 | -1 | 3 | 298715 | 0 | 3 | 2005.09.27. 18:34 | 275BD3 | 275BD3 | 8F047D |
| 0002 | 887C8E | 0 | 2 | | | | 2005.09.27. 7:05 | 75AD31 | 465B33 | 37A296 |
| 0003 | 4C9125 | 0 | 1 | | | | 2005.09.27. 12:05 | 8D9B3E | 5496CD | B39C73 |

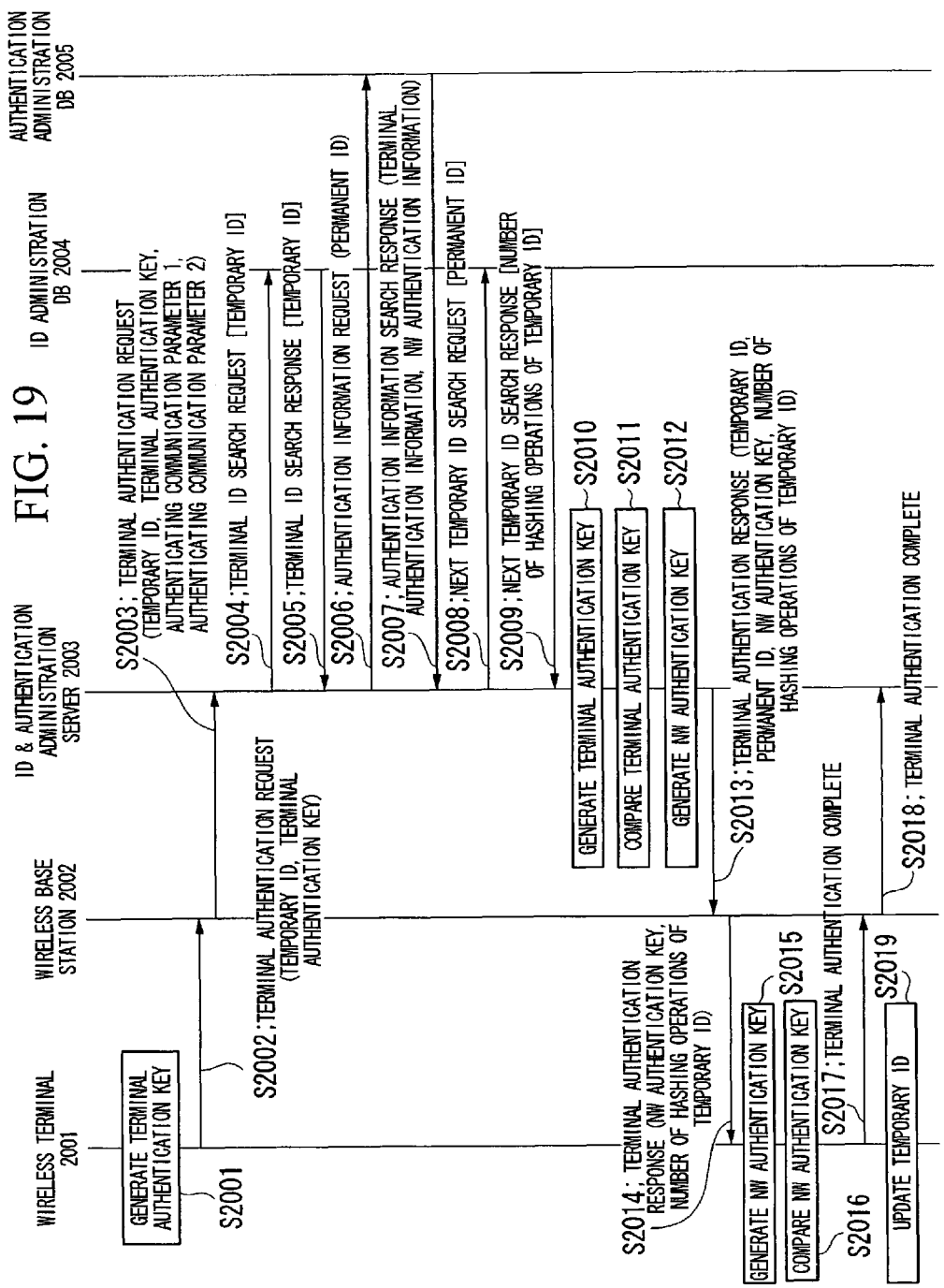

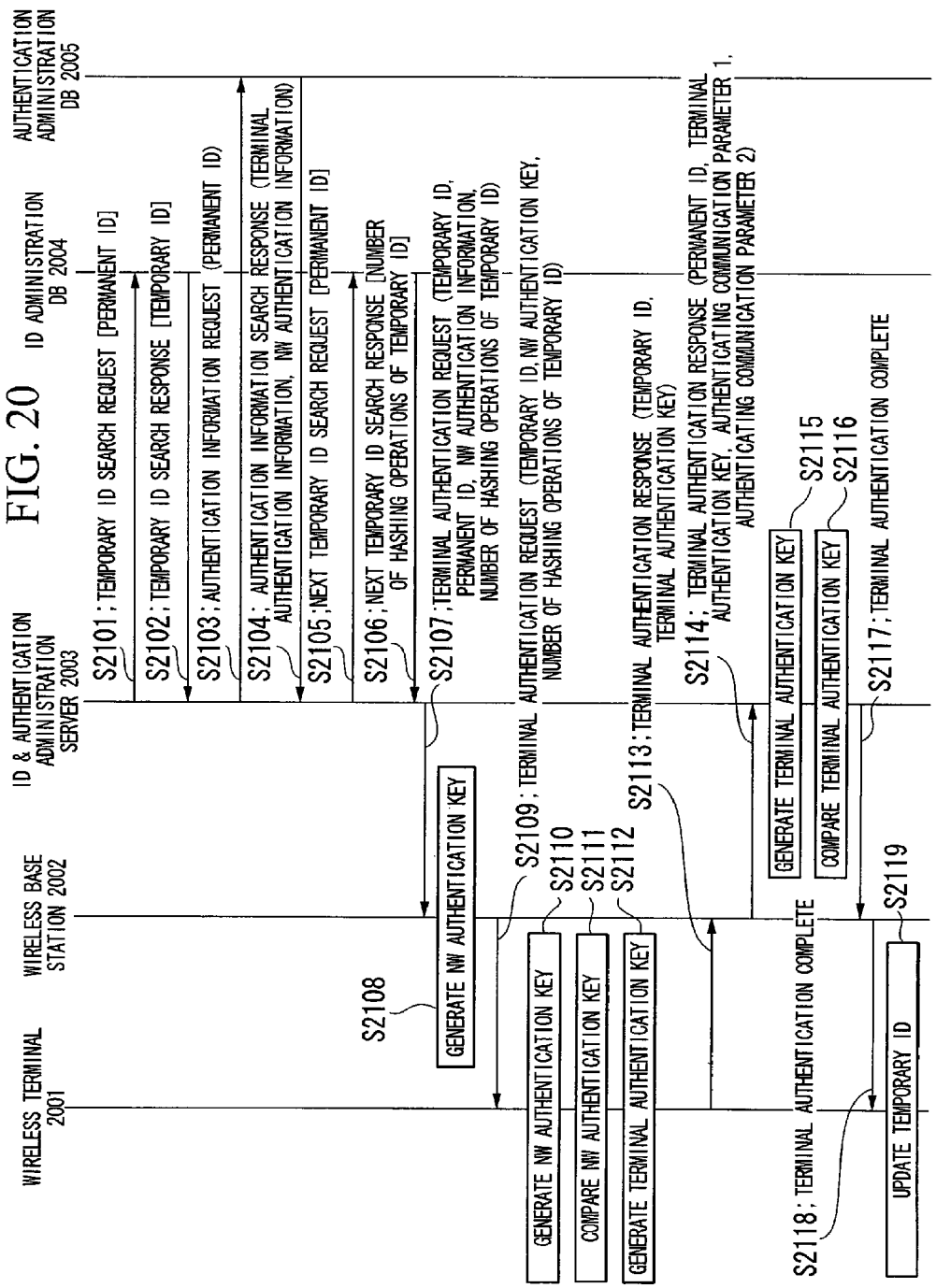

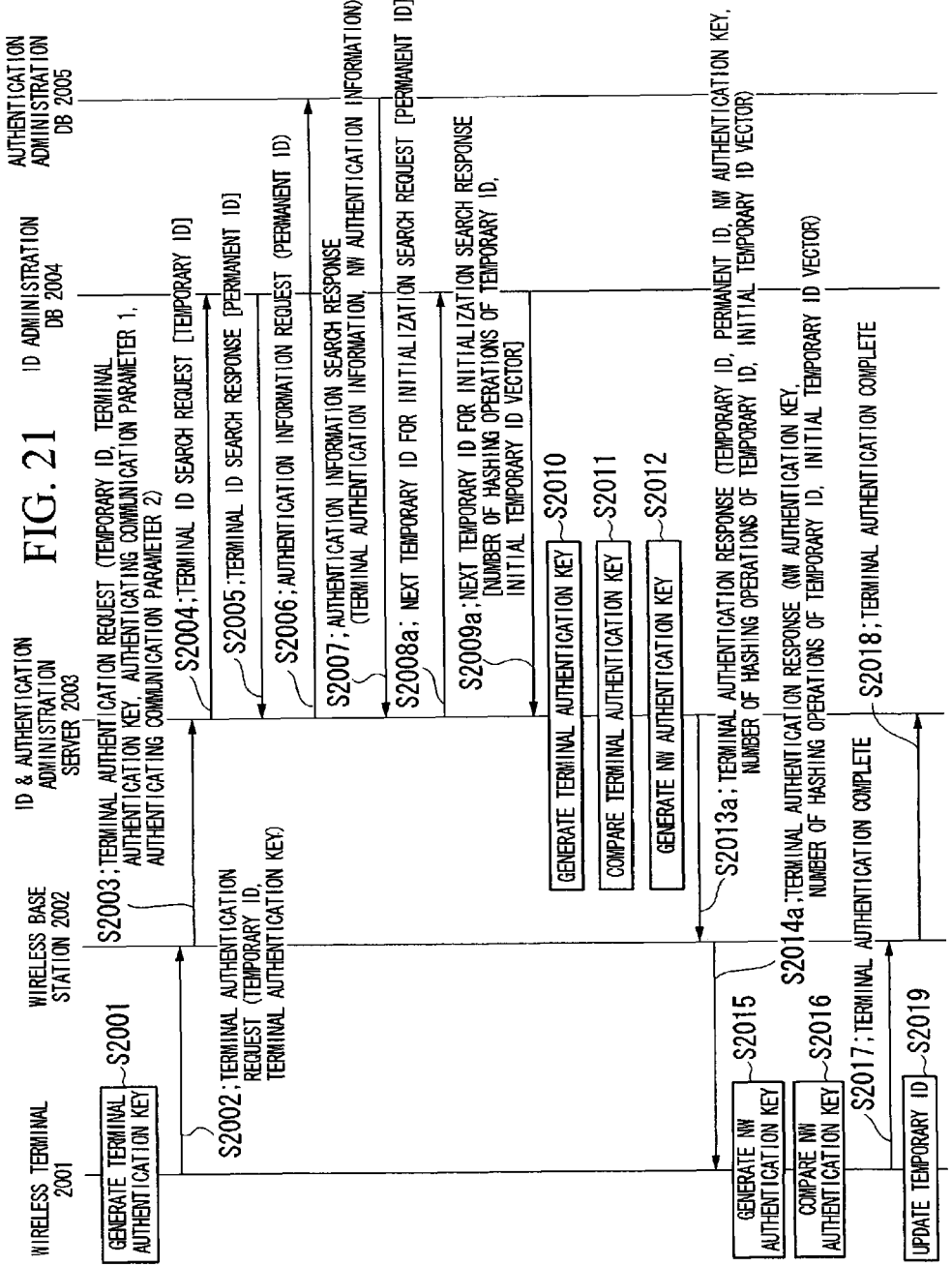

TERMINAL IDENTIFICATION METHOD, AUTHENTICATION METHOD, AUTHENTICATION SYSTEM, SERVER, TERMINAL, WIRELESS BASE STATION, PROGRAM, AND RECORDING MEDIUM

TECHNICAL FIELD

The present invention relates to a terminal identification method used in RFID (radio frequency identification) or the like which is required to provide protection of privacy. The present invention relates also to an authentication method employed between a wireless terminal and a server used in ubiquitous networking and network security.

Priority is claimed on Japanese Patent Application No. 2005-364522 filed on Dec. 19, 2005 and Japanese Patent Application No. 2006-127546 filed on May 1, 2006, the contents of which are incorporated herein by reference.

BACKGROUND ART

"Ubiquitous" is a buzz word in recent years. The word "ubiquitous" means an information system which allows it to use computers and network to, for example, acquire the status of a person or an object so as to monitor the overall situation of the place, or provide information pertinent to the circumstances.

What plays an important role in the ubiquitous is a sensor network. The sensor network is a system that employs the idea in which respective sensors incorporate miniature wireless devices therein, and the sensors autonomously circulate information with each other by air, so as to provide services which are suited for the location based on the collected data.

Applications for the sensor network include the fields such as disaster prevention, prevention of crimes, security, medical service, environment issue, and agriculture. The applications also include the fields such as the control of office air conditioner, coordination between a vehicle and information about roads or between vehicles with the sensor network mounted in an on-vehicle computer.

There are various kinds of sensors which include: in addition to those in common use which sense heat, temperature, moisture, humidity, sound, light, magnetism, wind, vibration, pressure, acceleration, and orientation; bio-sensors which measure such vital signs as blood pressure, pulsation, heartbeat, and blood sugar; and those which detect substances such as toxic compounds or rare useful resources. Combining these sensors enables it to gather vast kinds of information and provide various applications.

The applications encompass various fields, and information about the housing life of human being, human behavior, and bionomical information that provides ailments of human being can be transmitted, thus making it crucial to protect the privacy when transmitting such pieces of information.

Moreover, the transmitters must be extremely low in manufacturing cost, if they are to be mounted on various sensors.

Among those that can provide transmission at low costs is one called RFID. The RFID is provided in a tiny wireless chip and is used to provide the mechanism for the identification and management of individual persons or goods. However, no consideration has been paid to the protection of privacy.

One of methods addressing this problem employs a hash chain which provides the method for assigning a terminal ID that identifies a terminal within a network environment and undergoes dynamic changes for the purpose of security.

In a scheme that employs the hash chain (refer to non-patent document 1), for example, a value $S(k, 0)$ shared by an RFID tag which is uniquely identified by number k and by a server of the network (NW) is hashed i times with a hash function H to determine $S(k, i)$, and $a(k, i)$ obtained by hashing $S(k, i)$ with a hash function J (hash function G in non-patent document 1) is used as the i-th tag ID. The above calculation is done first by the tag, and the tag ID is sent to NW. A server in the NW calculates $a(k, i)$ for all the accommodated tags and creates a correspondence table between $a(k, i)$ and k in advance, and looks for the value of k corresponding to $a(k, i)$ which agrees with $a(k, i)$ that was sent from the tag, thereby to uniquely identify the tag of number k.

This scheme has such a feature that deleting the information of $S(k, 0)$ and $S(k, i-1)$ from a memory at the tag makes it difficult to infer the value of $a(k, i-1)$ from the value of $a(k, 0)$ of the past, even if $S(k, i)$ can be obtained from the discarded tag. This feature takes advantage of the fact that inverse calculation is difficult for hash function H. Moreover, because inverse calculation is difficult for hash function J, it is also difficult to infer the value of $S(k, i)$ from the value of $a(k, i)$ that has been sent out, thus it is difficult to infer $a(k, i+1)$ which is used next.

As a result, privacy of the tag's owner can be protected as it is difficult to track the tag by analyzing the tag's memory content or by eavesdropping the wireless communication.

Meanwhile, in the challenge & response authentication scheme, which is one of authentication schemes employed in ubiquitous networking, a server can authenticate a client without need to exchange a secret value held (shared) in advance by the server and the client (non-patent documents 2 and 3).

In the challenge & response authentication scheme, the server sends to the client a value called the challenge (for example, a random number RA described in page 55 of non-patent document 3) which varies every time. Here, a random number is generally used in the method for generating the value which varies every time.

Then, the client carries out calculation by combining the challenge and the secret value (for example, calculation using MAC (message authentication code) described in page 55 of non-patent document 3), and sends the result in a response (Hk described in page 55 of non-patent document 3) to the server. Last, the server carries out the calculation by combining the challenge and the secret value similarly to the client and compares the result of calculation of the server itself with the response received from the client. When it is determined that both values agree, the server authenticates the client as a legitimate client with which the server shares the secret value. In the case of mutual authentication, authentication is repeated by switching the roles of the server and the client. It should be noted that non-patent document 2 discloses a technology similar to that of non-patent document 3, except for the fact that the client in non-patent document 3 generates a random number RB and generates a response using this random number RB.

Thus in the challenge & response authentication scheme, the server and the client communicate a value which changes every time through a communication channel therebetween, and hence it is impossible for an eavesdropper who does not know the secret value shared in advance by the server and the client to pretend to be the client.

Non-patent document 1: Forward-Secure RFID Privacy Protection for Low-cost RFID: Miyako Ohkubo, Koutarou Suzuki, Shingo Kinoshita (NTT), CSS2003, pp. 491-496, October 2003

Non-patent document 2: Future Network Series, "Ubiquitous service network technology", Isao Miyake, Hiroshi Saito, Hideaki Yumiba; ISBN 4885499186, pp. 228-229; September 2003

Non-patent document 3: Applied Cryptography, Second Edition, Bruce Schneier, John Wiley & Sons, ISBN 0-471-11709-9, pp. 52-57 and 454-459; 1996

DISCLOSURE OF INVENTION

Problems to be Solved by the Invention

In the conventional method which uses the hash chain, however, it is difficult to synchronize the terminal ID between the NW and the terminal in an environment which allows only one-way communication from the terminal to the NW. Moreover, there has been a problem that a plurality of terminal IDs may have the same value.

In addition, in the method for generating ID using the hash chain, when ID (a(k, i)) has a small length, there arises a possibility of accidental collision of IDs among a plurality of wireless terminals. In this case, it is difficult for the NW to identify the wireless terminals. Moreover, probability of collision can be decreased by making the ID length larger, but cannot be made zero. There has also been a problem that making the ID length larger occupies more wireless bandwidth.

Also, the conventional scheme assumes one-way communication from the RFID tag to the NW. Therefore, a series of a(k, i) projected to the future must be calculated and held in a table. This is because it is difficult to synchronize S(k, i) of the NW server and S(k, i) of the wireless terminal. Specifically, there has been such a problem that when the RFID increments i and send the incremented i to the NW, it may not be received by the NW depending on the wireless environment, making the NW unable to determine whether i has been incremented or not.

Meanwhile, the above-described challenge & response authentication scheme requires it to generate and mutually exchange a value which varies every time authentication is attempted. While random number is typically used for the value which varies every time, generating random numbers requires a random number generating function and resources of the wireless terminal such as electric power used in calculating the random numbers. Moreover, transmitting the random number also consumes the wireless bandwidth and electric power for wireless communication. Furthermore, in the case of mutual authentication, the communication procedure requires it to communicate four messages because challenge and response are exchanged between both sides, thus causing a problem of consuming much resource of the wireless terminal and the wireless bandwidth.

Particularly, in case a large number of wireless terminals make communications simultaneously where the wireless terminals are mobile miniature wireless terminals of low cost such as that of sensor which have relatively low processing power and transmit typically a small amount of data, the disadvantage of the challenge & response authentication scheme becomes conspicuous due to the large calculation burden, large number of communications required to carry out authentication, and a number of communications for authentication. Also, a mobile miniature wireless terminal such as that of sensor needs to be operated over an extended period of time on a built-in battery, which underscores the disadvantage of the challenge & response authentication scheme.

Thus, there is a need for an authentication method which carries out mutual authentication possible without need for functions to carry out complicated calculation processes such as a public key encryption scheme, generation of random numbers, clock, etc., requires smaller amount of computation, less steps of wireless communication, and smaller amount of wireless communications, with less power consumption in communications for authentication.

The present invention has been made under these circumstances, and an object thereof is to provide a terminal identification method, a server, a terminal, a program, and a recording medium which enable two-way communications between terminals and a NW while identifying a plurality of terminal IDs and protecting privacy. Another object of the present invention is to provide an authentication method, an authentication system, a terminal, a server, a wireless base station, a program, and a recording medium which do not require complicated calculation processes for authentication, requires less steps of wireless communications, smaller amount of wireless communications, and less power consumption in communications for authentication.

Means for Solving the Problems

The present invention has been made so as to solve the problems described above. A terminal identification method of the present invention is a terminal identification method for identifying at least terminal in communication via a network between a server and the terminal, the method comprising: sharing a first hash function H and an initial value $S(k, 0)$ which is determined for each terminal between the server and the terminal; calculating a temporary ID at the server and the terminal based on a value $S(k, i)$ which is obtained by hashing the initial value $S(k, 0)$ i times with the first hash function H, or by performing a calculation using the initial value $S(k, 0)$, a parameter i, and the first hash function H; and calculating the same temporary ID at the server and the terminal by setting the same number of times of hashing operations at the server and the terminal to identify the terminal using the temporary ID.

In the terminal identification method of the present invention, the temporary ID may be calculated at the server and the terminal by further hashing the value $S(k, i)$, which has been hashed, with a second hash function J that is shared between the server and the terminal.

In the terminal identification method of the present invention, at each of the server and the terminal, preprocessing related to the number of times of hashing operations i may be carried out before hashing i times with the first hash function H, and a value obtained by the preprocessing and hashing with the first hash function H may be calculated as the temporary ID.

In the terminal identification method of the present invention, the number of times of hashing operations may be changed after performing a predetermined number of times of communications or authentication operations between the server and the terminal, or upon a predetermined period of time has elapsed.

In the terminal identification method of the present invention, the server may notify the terminal of the fact that the number of times of hashing operations has been changed after changing the number of times of hashing operations at the server.

In the terminal identification method of the present invention, the server may hold a temporary ID before changing, a temporary ID after the changing, and a difference between the number of times of hashing operations before the changing and the number of times of hashing operations after the changing.

In the terminal identification method of the present invention, in case the server has received a temporary ID before changing, the server may notify the terminal of a difference between the number of times of hashing operations before the changing and the number of times of hashing operations after the changing so that the terminal updates the temporary ID.

In the terminal identification method of the present invention, in case the server has received a temporary ID after changing, a temporary ID before the changing which is held in the server may be deleted.

In the terminal identification method of the present invention, in case the server makes communication with the terminal, a temporary ID before changing and a temporary ID after the changing which are held in the server may be used in succession so as to request the terminal to send a signal to the server.

In the terminal identification method of the present invention, in case a newly calculated temporary ID conflicts with a temporary ID of another terminal when the server attempts to change the temporary ID, in order to calculate a new temporary ID, the number of times of hashing operations may be changed until a temporary ID which does not conflict with the temporary ID of the other terminal is calculated.

In the terminal identification method of the present invention, the server may notify the terminal of information indicating the number of times of hashing operations for updating the temporary ID by authenticating the terminal using a terminal authentication key when the terminal makes communication with the server.

In the terminal identification method of the present invention, a signal for updating the temporary ID which the terminal has received may be reflected to the changing of the temporary ID in the terminal, by authenticating the server using a network authentication key when the server makes communication with the terminal.

In the terminal identification method of the present invention, in case the server receives a temporary ID which has been determined in advance between the server and the terminal from the terminal, the server may initialize the temporary ID by: generating an initial vector which has a different value every time the initial vector is generated; and calculating the number of times of hashing operations based on the initial vector, the first hash function H, and the initial value $S(k, 0)$.

In the terminal identification method of the present invention, in case the server has initialized the temporary ID, the server may notify the terminal of the initial vector and the number of times of hashing operations, to inform the terminal that the temporary ID has been initialized.

In the terminal identification method of the present invention, the terminal may calculate the temporary ID based on the initial value $S(k, 0)$, the initial vector notified by the server, and the number of times of hashing operations.

The server of the present invention is a server which communicates with a terminal connected therewith via a network, comprising: a memory unit which holds an initial value $S(k, 0)$ which is identical to an initial value held by the terminal; and a temporary ID calculating unit which calculates a temporary ID based on a value $S(k, i)$ obtained: by applying a hash function H to the initial value $S(k, 0)$ held in the memory unit, the same i times as the number of times of hashing operations at the terminal; or by applying a calculation which is identical to a calculation carried out at the terminal based on the initial value $S(k, 0)$, a parameter i, and the hash function H, wherein the server identifies the terminal using the temporary ID calculated by the temporary ID calculating unit.

The terminal of the present invention is a terminal which communicates with a server connected therewith via a network, comprising: a memory unit which holds an initial value $S(k, 0)$ which is identical to an initial value held by the server; and a temporary ID calculating unit which calculates a temporary ID based on a value $S(k, i)$ obtained: by applying a hash function H to the initial value $S(k, 0)$ held in the memory unit, the same i times as the number of times of hashing operations at the server; or by applying a calculation which is identical to a calculation carried out at the server based on the initial value $S(k, 0)$, a parameter i, and the hash function H, wherein the terminal communicates with the server using the temporary ID calculated by the temporary ID calculating unit.

The program of the present invention is a program executed by a computer of a server which communicates with a terminal connected therewith via a network, comprising: a temporary ID calculating step of generating a value $S(k, i)$ obtained by applying a hash function H to an initial value $S(k, 0)$ which is identical to an initial value held by the terminal, the same i times as the number of times of hashing operations at the terminal, or by applying a calculation which is identical to a calculation carried out at the terminal based on the initial value $S(k, 0)$, a parameter i, and the hash function H, and calculating a temporary ID based on the value $S(k, i)$; and a terminal identifying step of identifying the terminal using the temporary ID calculated in the temporary ID calculating step.

The program of the present invention is a program executed by a computer of a terminal which communicates with a server connected therewith via a network, comprising: a temporary ID calculating step of generating a value $S(k, i)$ obtained by applying a hash function H to an initial value $S(k, 0)$ which is identical to an initial value held by the server, the same i times as the number of times of hashing operations at the server, or by applying a calculation which is identical to a calculation carried out at the server based on the initial value $S(k, 0)$, a parameter i, and the hash function H, and calculating a temporary ID based on the value $S(k, i)$; and a step of communicating with the server using the temporary ID calculated in the temporary ID calculating step.

The authentication method of the present invention is an authentication method used in communication between a server and a terminal, comprising: holding, at the server and the terminal, a hash function and authentication information in common; acquiring, at the server and the terminal, a communication parameter which is temporarily common during the communication between the server and the terminal as an authenticating communication parameter; generating, at the server and the terminal, an authentication key using the hash function based on the authentication information and the authenticating communication parameter; and carrying out, at least at one of the server and the terminal, authentication between the server and the terminal using the authentication key which has been generated.

In the authentication method of the present invention, the communication between the server and the terminal may be carried out via a wireless base station while communication between the terminal and the wireless base station may be carried out by wireless communication, and the communication parameter may be a wireless communication parameter which is temporarily common during the wireless communication between the terminal and the wireless base station.

In the authentication method of the present invention, the terminal and the server may hold a first hash function and first authentication information in common, the terminal may generate a first terminal authentication key, as the authentication key, using the first hash function based on the authenticating communication parameter and the first authentication information, and send the first terminal authentication key thus generated to the server via the wireless base station, the wireless base station may attach the wireless communication parameter between the terminal and the wireless base station, as the authenticating communication parameter, to the first terminal authentication key received from the terminal, and send the wireless communication parameter and the first terminal authentication key to the server, and the server may receive the first terminal authentication key and the authenticating communication parameter which is attached by the wireless base station, from the wireless base station, generate a second terminal authentication key, as the authentication key, using the first hash function based on the authenticating communication parameter and the first authentication information which have been received, and authenticate the terminal by determining whether the first terminal authentication key thus received and the second terminal authentication key thus generated are identical.

In the authentication method of the present invention, the terminal and the server may hold a second hash function and second authentication information in common, the server may further generate a first network authentication key, as the authentication key, using the second hash function based on the authenticating communication parameter which has been received and the second authentication information, and send the first network authentication key thus generated to the terminal via the wireless base station, the terminal may further receive the first network authentication key from the server via the wireless base station, generate a second network authentication key, as the authentication key, using the second hash function based on the authenticating communication parameter which is used when generating the first terminal authentication key and on the second authentication information, and authenticate the server by determining whether the first network authentication key thus received and the second network authentication key thus generated are identical.

In the authentication method of the present invention, the terminal and the server may hold a first hash function and first authentication information in common, the server may further send the first authentication information to the wireless base station, the wireless base station may further generate a first network authentication key, as the authentication key, using the first hash function based on the authenticating communication parameter and the first authentication information received from the server, and send the first network authentication key thus generated to the terminal, and the terminal may further receive the first network authentication key from the wireless base station, generate a second network authentication key, as the authentication key, using the first hash function based on the authenticating communication parameter and the first authentication information, and authenticate the server by determining whether the first network authentication key thus received and the second network authentication key thus generated are identical.

In the authentication method of the present invention, the server and the terminal may hold a second hash function and second authentication information in common, the terminal may generate a first terminal authentication key, as the authentication key, using the second hash function based on the second authentication information and the authenticating communication parameter used when generating the second network authentication key, and send the first terminal authentication key thus generated to the wireless base station, the wireless base station may attaches the wireless communication parameter between the terminal and the wireless base station, as the authenticating communication parameter, to the first terminal authentication key received from the terminal, and send the wireless communication parameter and the first terminal authentication key to the server, and the server may receive the first terminal authentication key and the authenticating communication parameter from the wireless base station, generate a second terminal authentication key, as the authentication key, using the second hash function based on the authenticating communication parameter which has been received and on the second authentication information, and authenticate the terminal by determining whether the first terminal authentication key thus received and the second terminal authentication key thus generated are identical.

In the authentication method of the present invention, the wireless communication parameter may be a terminal identifier, a frame number, a slot number, clock information, an identifier of the wireless base station, an identifier of a paging area, the number of terminal groups serviced by the wireless base station, the number of communication carriers provided by the wireless base station, an index indicating a congestion condition of communication notified by the wireless base station, a terminal group number to which the terminal belongs, a communication carrier number used by the terminal in communication, a random number used in control of communication, or a combination thereof.

The authentication system of the present invention is an authentication system in which a terminal and a server make authentication via a wireless base station, the terminal and the wireless base station make wireless communication with each other, and the server and the terminal hold a hash function and authentication information in common, wherein the terminal comprises: a terminal side authentication parameter acquiring unit which acquires, as an authenticating communication parameter, a communication parameter which is temporarily common during communication between the terminal and the wireless base station; a terminal side authentication key generating unit which generates a first authentication key based on the authenticating communication parameter acquired by the terminal side authentication parameter acquiring unit, the authentication information, and the hash function; and a terminal side authentication key sending unit which sends the first authentication key via the wireless base station to the server, the wireless base station comprises: a wireless base station side authentication parameter acquiring unit which acquires, as an authenticating communication parameter, a communication parameter which is temporarily common during communication between the terminal and the wireless base station; and a forwarding unit which attaches the authenticating communication parameter acquired by the wireless base station side authentication parameter acquiring unit to the first authentication key sent by the terminal, and sends the authenticating communication parameter and the first authentication key to the server, and the server comprises: a server side receiving unit which receives the first authentication key with the authenticating communication parameter attached thereto from the wireless base station; a server side authentication key generating unit which generates a second authentication key based on the authenticating communication parameter received by the server side receiving unit, the authentication information, and the hash function; and a server side authenticating unit which authenticates the terminal by determining whether the second authentication key which has been generated and the first authentication key which has been received are identical.

The terminal of the present invention is a terminal used in an authentication system in which the terminal and a server make authentication via a wireless base station, the terminal and the wireless base station make wireless communication with each other, and the server and the terminal hold a hash function and authentication information in common, comprising: a terminal side authentication parameter acquiring unit which acquires, as an authenticating communication parameter, a communication parameter which is temporarily common during communication with the wireless base station; a terminal side authentication key generating unit which generates a first authentication key based on the authenticating communication parameter acquired by the terminal side authentication parameter acquiring unit, the authentication information, and the hash function; and a terminal side authentication key sending unit which sends the first authentication key via the wireless base station to the server.

The wireless base station of the present invention is a wireless base station used in an authentication system in which a terminal and a server make authentication via the wireless base station, the terminal and the wireless base station make wireless communication with each other, and the server and the terminal hold a hash function and authentication information in common, comprising: a wireless base station side authentication parameter acquiring unit which acquires, as an authenticating communication parameter, a communication parameter which is temporarily common during communication between the terminal and the wireless base station; and a forwarding unit which attaches the authenticating communication parameter acquired by the wireless base station side authentication parameter acquiring unit to an authentication key sent from the terminal, and sends the authenticating communication parameter and the authentication key to the server.

The server of the present invention is a server used in an authentication system in which a terminal and the server make authentication via a wireless base station, the terminal and the wireless base station make wireless communication with each other, and the server and the terminal hold a hash function and authentication information in common, comprising: a server side receiving unit which receives a first authentication key with an authenticating communication parameter attached thereto from the wireless base station; a server side authentication key generating unit which generates a second authentication key based on the authenticating communication parameter received by the server side receiving unit, the authentication information, and the hash function; and a server side authenticating unit which authenticates the terminal by determining whether the second authentication key which has been generated and the first authentication key which has been received are identical.

The program of the present invention is a program executed by a computer of a terminal used in an authentication system in which the terminal and a server make authentication via a wireless base station, the terminal and the wireless base station make wireless communication with each other, comprising: a terminal side authentication parameter acquiring step of acquiring, as an authenticating communication parameter, a communication parameter which is temporarily common during communication with the wireless base station; a terminal side authentication key generating step of generating a first authentication key based on the authenticating communication parameter acquired in the terminal side authentication parameter acquiring step, a hash function shared by the server, and authentication information shared by the server; and a terminal side authentication key sending step of sending the first authentication key generated in the terminal side authentication key generating step via the wireless base station to the server.

The program of the present invention is a program executed by a computer of a wireless base station used in an authentication system in which a terminal and a server make authentication via the wireless base station, the terminal and the wireless base station make wireless communication with each other, and the server and the terminal hold a hash function and authentication information in common, comprising: a wireless base station side authentication parameter acquiring step of acquiring, as an authenticating communication parameter, a communication parameter which is temporarily common during communication between the terminal and the wireless base station; and a forwarding step of attaching the authenticating communication parameter acquired in the wireless base station side authentication parameter acquiring step to an authentication key sent from the terminal, and sending the authenticating communication parameter and the authentication key to the server.

The program of the present invention is a program executed by a computer of a server used in an authentication system in which a terminal and the server make authentication via a wireless base station, the terminal and the wireless base station make wireless communication with each other, comprising: a server side receiving step of receiving a first authentication key with an authenticating communication parameter attached thereto from the wireless base station; a server side authentication key generating step of generating a second authentication key based on the authenticating communication parameter received in the server side receiving step, authentication information shared by the terminal, and a hash function shared by the terminal; and a server side authenticating step of authenticating the terminal by determining whether the second authentication key which has been generated in the server side authentication key generating step and the first authentication key which has been received are identical.

The recording medium of the present invention is a computer-readable recording medium which records the foregoing respective programs.

Effect of the Invention

According to the present invention, the server at the network side and the terminal synchronize the number of hashing operations (i.e. set to the same value), which is the basis for generating a temporary ID for the purpose of identifying the terminal. Moreover, when the server changes the temporary ID, the server selects the number of hashing operations so that it will not be the same as the temporary IDs assigned to other terminals. Thus, a temporary ID different from the temporary IDs of any other terminal is obtained. Also, because the temporary ID can be synchronized between the network and the terminal, the terminal can be identified by means of the temporary ID which dynamically changes. Making communication between the terminal and the server by using the temporary ID enables it to prevent a third party from tracking the terminal and provides communication of the terminal while ensuring the protection of privacy.

Also, according to the present invention, as the number of hashing operations is specified, wireless bandwidth can be saved in comparison to a case where the temporary ID itself is specified, and the need of encryption is eliminated. Specifically, since the number of hashing operations can be represented by a far smaller number of bits than the temporary ID used in identifying several tens of billions of terminals, updating requires smaller amount of information so that wireless bandwidth can be used more efficiently. Moreover, in case the temporary ID to be used next is sent to the wireless terminal, it must be encrypted lest it should be eavesdropped thus making it impossible to prevent tracking. However, the present invention eliminates the need for encryption.

Also, according to the present invention, the number of steps required in mutual authentication between a wireless terminal and an authentication administration server can be decreased from that of the conventional techniques, so that the number of steps of wireless communication and the amount of wireless communications by the wireless terminal can be decreased. In particular, since it is not necessary to generate a new authentication parameter which changes with time in a wireless section and to communicate the authentication parameter, the amount of computation processes and the amount of wireless communications made by the wireless terminal are decreased. In addition, authentication can be carried out without need of functions to carry out complicated computation such as public key cryptography scheme and generation of random numbers, with less power consumption in communications for authentication.

Also, according to the present invention, since a plurality of communication parameters which are temporarily common during communication between the wireless terminal and the wireless base station can be combined and used as authentication parameters, the values of the authentication parameters can be varied in a more complex pattern, thus resulting in more random nature of the authentication key and higher security in authentication.

BRIEF DESCRIPTION OF THE DRAWINGS

FIG. 3 is a block diagram showing an example of the content stored in an ID administration DB 104 used in the first embodiment.

FIG. 19 is a sequence diagram showing the flow of the process of the entire system in case the wireless terminal requests an ID & authentication administration server to start authentication in the third embodiment.

FIG. 20 is a sequence diagram showing the flow of the process of the entire system in case the ID & authentication administration server requests the wireless terminal to start authentication in the third embodiment.

FIG. 21 is a sequence diagram showing the flow of the process of the entire system for a temporary ID initialization process in the third embodiment.

DESCRIPTION OF REFERENCE SYMBOLS

Figure 1:
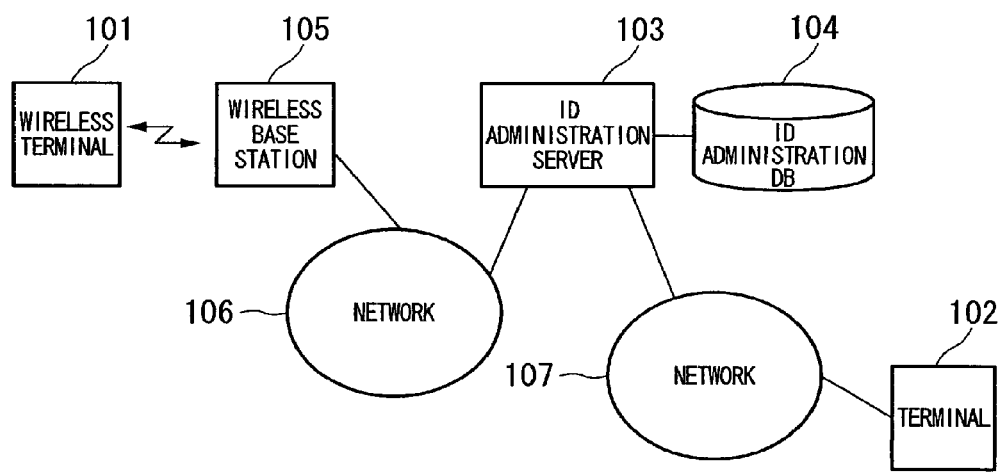
FIG. 1 is a block diagram showing the constitution of a data communication system where a terminal identification method according to a first embodiment of the present invention is applied.

101 Wireless terminal
102 Terminal
103 ID administration server
104 ID administration DB
105 Wireless base station
106 Network
107 Network
1101 Wireless terminal
1102 Wireless base station
1103 Authentication administration server
1104 Authentication administration database
1105 Network
1210, 1310 Authentication parameter acquiring section
1211, 1311 Authentication parameter generating section
1212, 1312 Authentication information acquiring section
1213, 1313 Authentication key generating section
1203 Authentication key sending section
1301 Authentication key receiving section
1302 Authentication key acquiring section
1303 Authentication section
2001 Wireless terminal
2002 Wireless base station
2003 ID & authentication administration server
2004 ID administration database
2005 Authentication administration database
2006 Terminal 2007 Network
2008 Network

BEST MODE FOR CARRYING OUT THE INVENTION

Embodiments of the present invention will now be described with reference to the accompanying drawings.

First Embodiment

First, key points of this embodiment will be described. Assume two-way communication between a wireless terminal and a NW. In order to mutually carry out integrated authentication, an ID administration server calculates the value of increment d (an integer equal to or larger than 0) of i (an integer equal to or larger than 0) which represents the version of ID, along with NW authentication information. The ID administration server stores the increment d in an ID administration DB (database) (temporary ID reservation of the embodiment to be described later) and notifies it to the wireless terminal (a terminal authentication response of the embodiment to be described later), so that the value of i is incremented by d in both the wireless terminal and the ID administration server (storage in the ID administration server is the ID administration DB), with S(k, i) of the wireless terminal and S(k, i) of the ID administration server always be synchronized.

The increment d of i must be calculated in such a manner that a new ID does not conflict with the ID of another wireless terminal which is already used. Therefore, the ID administration server installed in the NW registers the ID of the wireless terminal to be used next in the ID administration DB. If collision of ID is found when it is attempted to newly register an ID which is already registered, the ID administration server refuses to register it in the ID administration DB. If there is no collision of ID, the ID is registered in the ID administration DB. When registration is refused, i is incremented to generate a next ID, and registration is attempted again. The ID administration server counts the number of times i is incremented until registration is successfully done, and it is made the increment d for i.

The wireless terminal which has been notified of the increment d for i generates a new ID by applying a hash function d times, and then takes i+d as the new value of i. Thus, the temporary ID which is unique to the network can be generated.

Moreover, since the wireless terminal is identified by the temporary ID in the network between the ID administration server and the wireless terminal, it is difficult to track the wireless terminal even when an access network of the wireless terminal is eavesdropped.

Even in case each wireless terminal sends an ID which varies with time so as to prevent tracking of the wireless terminal, the NW never receives an identical ID from different wireless terminals at the same time. As a result, the NW can achieve unique identification of the wireless terminal and prevention of tracking at the same time, and is therefore capable of performing forwarding to the required destination.

Moreover, since the wireless terminal is identified with the ID which varies with time in the access network which accommodates the wireless terminal, it is difficult to track the wireless terminal.

This embodiment will now be described in more detail. FIG. 1 is a general view of this embodiment. A wireless terminal 101 is identified with a temporary ID, and is also identified with a permanent ID, which is a ubiquitous ID. Each of all the temporary IDs and the permanent IDs are unique for each of the wireless terminals, and allows it to surely identify a particular wireless terminal.

The wireless terminal 101 is a device for collecting information from sensors or the like and sending the information together with a temporary ID to a terminal 102. This transmission is relayed by an ID administration server 103, while the temporary ID is converted into a permanent ID by the ID administration server 103, and the permanent ID and sensor data are sent to the terminal 102. Alternatively, setting information or the like of a sensor is sent together with the permanent ID from the terminal 102, while the permanent ID is converted into the temporary ID by the ID administration server 103, the ID administration server 103 calls up the wireless terminal 101 with the temporary ID, so that the wireless terminal 101 receives the setting information or the like of the sensor from the terminal 102 along with authentication information of the NW.

The ID administration server 103 accesses an ID administration DB 104 so as to acquire a temporary ID from a permanent ID, acquire a permanent ID from temporary ID, or generate a new temporary ID. The ID administration DB 104 stores the correspondence between the temporary ID and the permanent ID. A wireless base station 105 terminates a wireless channel for the wireless terminal 101, and connects the wireless terminal 101 to a network 106. The wireless base station 105 and the ID administration server 103 are connected to the network 106. The wireless terminal 101 is identified by the temporary ID in the network 106. This makes it difficult to track the wireless terminal within the network 106 between the ID administration server 103 and the wireless base station 105 and in the wireless section between the wireless base station 105 and the wireless terminal 101. Moreover, the ID administration server 103 and the terminal 102 are connected to a network 107. In the network 107, the wireless terminal is identified by the permanent ID.

In the network 107, while communications to the respective wireless terminals can be captured, it is unknown which wireless base station accommodates the respective wireless terminals, and therefore the wireless terminals cannot be located by tracking.

Suppose a case, for example, of tracking visitors to an event site by means of RFID. In this case, the wireless terminal 101 may include a sensor capable of sensing the location within the site and an RFID tag associated thereto, which is attached to a visitor's pass given to the visitors to the event site. The RFID sends information on the visitor's location at predetermined time intervals. The information thus sent is received by the wireless base station 105 installed in the event site and is sent via the network 106, the ID administration server 103, the ID administration DB 104, and the network 107 to the terminal 102 where the information is stored as the visitor's location (track).

The terminal 102 may send information related to the booths the visitor has stopped at, derived from the track of the visitor, to the visitor's cell phone via an electronic mail.

Moreover, the visitor can check the booths later where he or she stopped at, by accessing to the terminal 102 from a personal computer (PC).

In such a case, too, the effects of this embodiment ensure protection of privacy as to the booths at which the visitor stopped from third parties.

Moreover, when the visitor to the event site enters or exits the site, the terminal 102 may send information for setting the wireless terminal 101, thereby to change the setting for the time interval at which the wireless terminal 101 makes sending. For example, a position sensor and RFID may be set so as to send information at one-minute intervals when located in the site and at five-minute intervals when out of the site.

Figure 2:
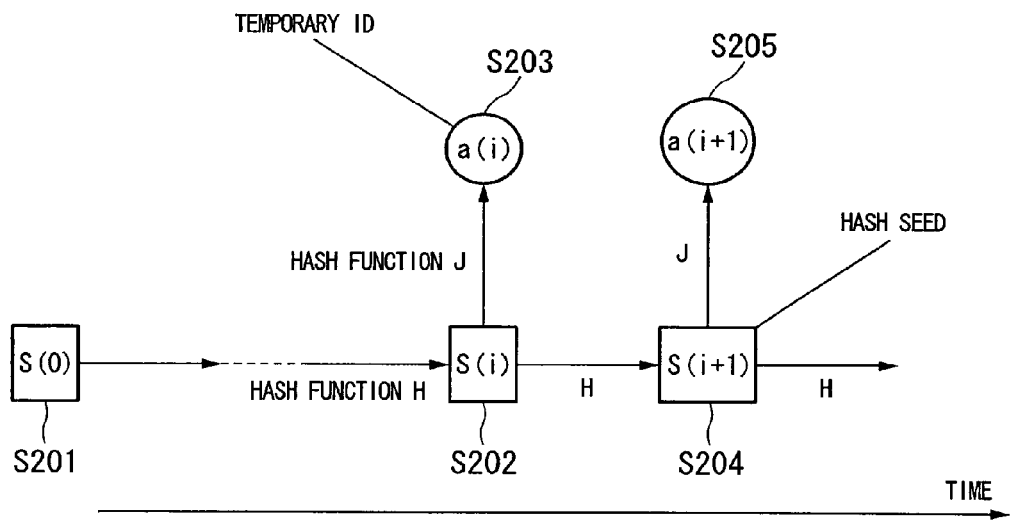
FIG. 2 is a block diagram showing a method for calculating a temporary ID used in the first embodiment.

A method for calculating the temporary ID is shown in FIG. 2. The wireless terminal 101 having a permanent ID of k and the ID administration server 103 share secret information of S(k, 0) (step S201). Since FIG. 2 assumes that the permanent ID is k, suffix k is omitted. The wireless terminal 101 and the ID administration server 103 each hashes a hash seed S(k, 0) i times with a hash function H so as to determine S(k, i) (step S202), and use a(k, i) obtained by hashing S(k, i) with a hash function J as the temporary ID (step S203). At this time, the wireless terminal 101 and the ID administration server 103 (ID administration DB 104) store k and S(k, i). Thereafter, the temporary ID to be used next (NEXT temporary ID) can be calculated by hashing S(k, i) with the hash function H d times to determine S(k, i+d) (step S204), which is hashed with the hash function J to obtain a(k, i+d) that is used as the NEXT temporary ID (step S205). The calculation to determine the NEXT temporary ID is carried out independently at the wireless terminal 101 and at the ID administration server 103. FIG. 2 shows a case where d is 1.

FIG. 3 shows an example of content stored in the ID administration DB 104. The ID administration DB 104 stores the permanent ID, several sets of (temporary ID, temporary ID pointer, and the number of hashing operations), the latest hash seed S(k, i), the initial hash seed S(k, 0), a temporary ID updating time when the temporary ID was updated last, and temporary ID for initialization, which are stored for each wireless terminal. It should be noted that the temporary ID for initialization is a field which is needed only when the temporary ID initialization process to be described later is carried out. Moreover, while the initial hash seed is set so as to be different from wireless terminal to wireless terminal, it is not required that it has a unique value for every wireless terminal, that is, it is not necessary to make the initial hash seed of one wireless terminal different from that of any other wireless terminals. In addition, the initial hash seed and the temporary ID for initialization remain unchanged throughout the duration of service, with the preset values thereof being maintained.

Figure 4:
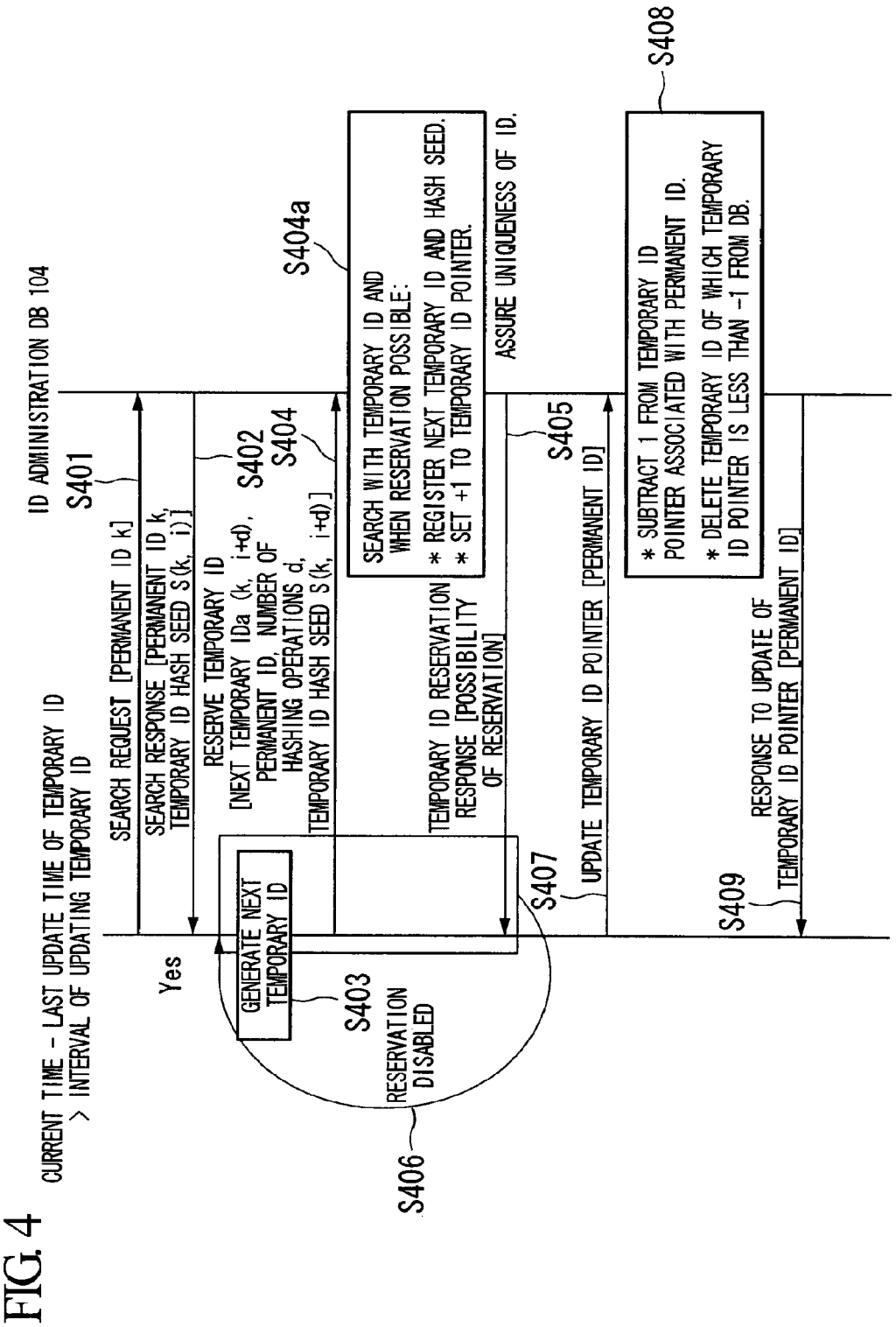
FIG. 4 is a flow chart showing the generation of the temporary ID used in the first embodiment.

The ID administration server 103 updates the temporary ID of the wireless terminal 101 after making a predetermined number of communications or authenticating operations, or after lapse of a predetermined period of time. The flowchart of updating is shown in FIG. 4. While FIG. 4 shows a case where the temporary ID is updated after lapse of a predetermined period of time, the same applies to a case where the temporary ID is updated after making a predetermined number of communications or authenticating operations. First, the ID administration server 103 connects to the ID administration DB 104, so as to acquire the hash seed S(k, i) of the temporary ID using the permanent ID k as a key (steps S401, S402). Then the ID administration server 103 hashes the hash seed S(k, i) of the temporary ID once with the hash function H so as to determine S(k, i+1), and hashes S(k, i+1) with the hash function J to calculate a(k, i+1) (step S403). A(k, i+1) thus calculated is registered in the ID administration DB 104, and the temporary ID is reserved (step S404). The ID administration DB 104 compares a(k, i+1) with the temporary IDs (a) of all the wireless terminals registered therein so as to permit reservation if there is no conflicting ID and deny reservation if there is conflicting ID (step S404a), while returning the result to the ID administration server 103 (step S405). When notified that the reservation is denied, the ID administration server 103 further hashes S(k, i+1) once with the hash function H so as to determine S(k, i+2), then hashes S(k, i+2) with the hash function J to calculate a(k, i+2) (step S406) which is then registered in the ID administration DB 104, and the temporary ID is reserved. In this way, the ID administration server 103 continues hashing operations with the hash function H until the temporary ID is reserved in the ID administration DB 104. Assuming that the number of hashing operations is d, then the NEXT temporary ID to be used next is a(k, i+d). When the NEXT temporary ID is registered in the ID administration DB 104, S(k, i+d) becomes a new hash seed. The above procedure is repeated for the NEXT temporary ID in the next session using S(k, i+d) as the new S(k, i).

Each temporary ID has a temporary ID pointer attached thereto. The temporary ID is associated with the temporary ID pointer and the number of hashing operations required for generating it, which are stored in the ID administration DB 104 (steps S407, S408, and S409). The temporary ID pointer indicates that the temporary ID to be currently used is 0 and the last temporary ID is −1. That is, +1 is set in the temporary ID pointer for the temporary ID to be used next (step S404a), and the temporary ID pointers (of which value is either +1, 0, or −1) of all the temporary IDs associated with the permanent ID is decremented by 1, when updating the temporary ID pointer (step S408). This makes the temporary ID pointer of the temporary ID to be currently used 0, the temporary ID pointer of the last temporary ID −1, and the temporary ID pointer of the one before the last temporary ID −2. Then the temporary ID of which temporary ID pointer is smaller than −1 is deleted from the ID administration DB 104 (step S408).

Figure 5:
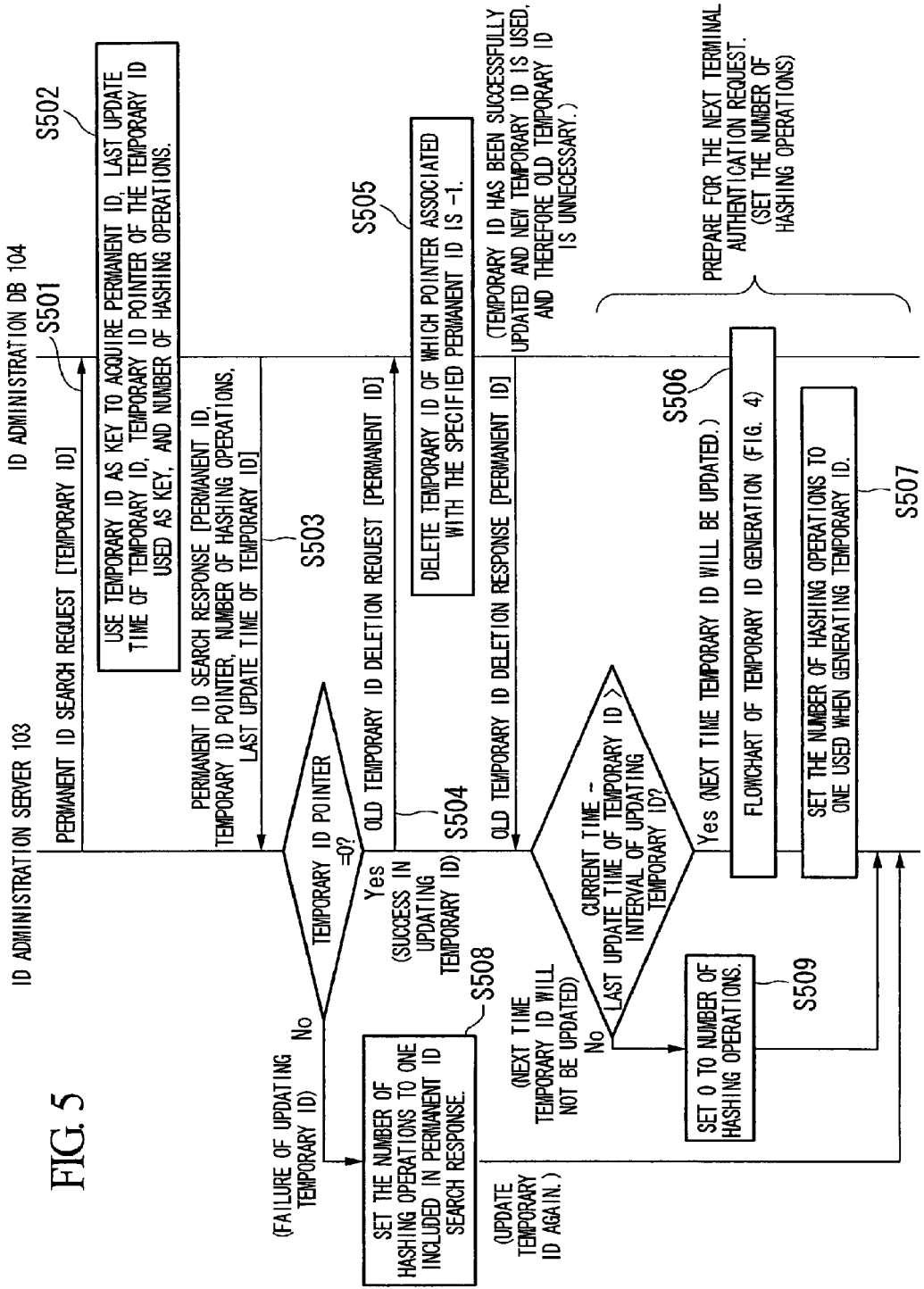
FIG. 5 is a flow chart showing the searching for permanent ID used in the first embodiment.

FIG. 5 shows the flowchart showing the procedures in which the ID administration server 103 accesses the ID administration DB 104, searches for the permanent ID from the temporary ID, and updates the temporary ID information of the ID administration DB 104.

The ID administration server 103 sends a permanent ID search request including the temporary ID to the ID administration DB 104 (step S501). The ID administration DB 104 which has received the permanent ID search request checks all temporary IDs stored in the ID administration DB 104. When a temporary ID that agrees with the sent temporary ID is found, the ID administration DB 104 identifies the permanent ID and acquires the last temporary ID updating time, and the temporary ID pointer and the number of hashing operations which are associated with the temporary ID (step S502). The ID administration DB 104 sends the permanent ID, the last temporary ID updating time, the temporary ID pointer, and the number of hashing operations thus acquired to the ID administration server 103 as parameters carried in a permanent ID search response (step S503). The ID administration server 103 that has received the permanent ID search response checks the temporary ID pointer. When the temporary ID pointer is 0 (the previous updating of the temporary ID was successfully done), the ID administration server 103 sends an old temporary ID deletion request specifying the permanent ID to the ID administration DB 104 (step S504), so as to delete the temporary ID of which temporary ID pointer corresponding to the specified permanent ID is −1 (step S505). Then if the difference between the current time and the last update time of temporary ID is larger than the interval of updating the temporary ID, the flowchart of generating the temporary ID (FIG. 4) is carried out (step S506). The ID administration server 103 determines the number of hashing operations for forwarding to the wireless terminal 101 (step S507). When the temporary ID pointer is −1 (the previous updating of the temporary ID failed), the number of hashing operations of the permanent ID search response received from the ID administration DB 104 is used as the number of hashing operations forwarded to the wireless terminal 101 (step S508). If the difference between the current time and the last update time of temporary ID is smaller than the interval of updating the temporary ID, the number of hashing operations forwarded to the wireless terminal 101 is set to 0 (step S509). If the difference between the current time and the last update time of temporary ID is larger than or equal to the interval of updating the temporary ID, the number of hashing operations obtained by the flowchart of generating the temporary ID (FIG. 4) is used as the number of hashing operations forwarded to the wireless terminal 101 (step S507).

As described above, while the wireless terminal 101 and the ID administration server 103 carry out hashing operations while keeping synchronization, instability of the communication channel may disable it to achieve complete synchronization despite a large number of attempts being made due to such troubles as missing an ACK, or missing an ACK to an ACK. Thus, the flow of searching for the permanent ID shown in the flowchart of FIG. 5 is based on the principle of detecting a disparity in synchronization of a single communication and restoring it.

The actual process of data transmission will now be described.

Figure 6:
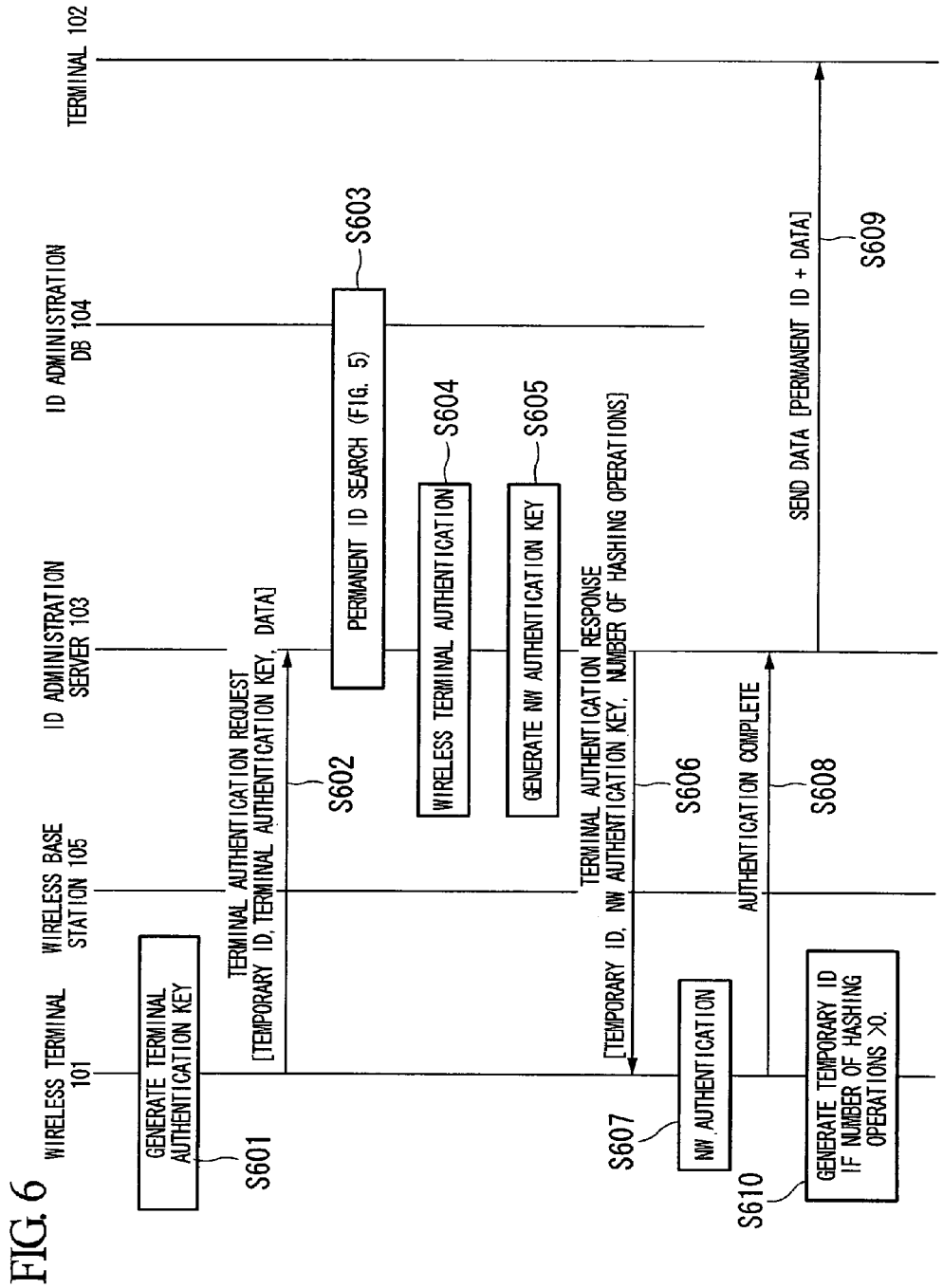
FIG. 6 is a flow chart for explaining the uploading from a terminal in the first embodiment.

First, a case of uploading data from the wireless terminal 101 to the terminal 102 is shown in FIG. 6. First, the wireless terminal 101 generates a terminal authentication key (step S601). Then the wireless terminal 101 sends a terminal authentication request carrying parameters of the temporary ID, the terminal authentication key, and data toward the terminal 102 (step S602). At this time, since it is not known to the ID administration server 103 that relays communications between the wireless terminal 101 and the terminal 102, which wireless terminal has sent the terminal authentication request and whether the wireless terminal 101 is a legitimate terminal or not, the data which has been received is put in pending state. Then the ID administration server 103 searches for the permanent ID in accordance with the flowchart shown in FIG. 5 (step S603), and identifies the wireless terminal 101 which has sent the terminal authentication request by converting the temporary ID into a permanent ID (step S604). Moreover, if it is necessary to update the temporary ID, the ID administration server 103 obtains the number of hashing operations d required for updating. Then the ID administration server 103 uses the terminal authentication key to verify that the wireless terminal which has been identified is a legitimate sender. Then the ID administration server 103 generates its own NW authentication key (step S605), and sends it in a terminal authentication response to the wireless terminal 101 (step S606). Parameters of the terminal authentication response are the temporary ID, the NW authentication key, and the number of hashing operations. The number of hashing operations determined by the ID administration server 103 in the flowchart of searching for the permanent ID shown in FIG. 5 is used. Upon receiving the terminal authentication response (step S607), the wireless terminal 101 uses the NW authentication key to verify the legitimacy of the NW device (the ID administration server 103) that relayed the data, and then notifies the ID administration server 103 of completion of the authentication (step S608). The ID administration server 103 which has been notified of completion of the authentication sends the data, which is addressed to the terminal 102 and has been pending, together with the permanent ID to the terminal 102 (step S609). Moreover, the wireless terminal 101 hashes $S(k, i)$ the number of times corresponding to the number of hashing operations d notified in the terminal authentication response with the hash function H so as to determine $S(k, i+d)$, which is hashed with the hash function J to obtain $a(k, i+d)$ that is used as the temporary ID to be used next (step S610). These processes are repeated by using $S(k, i+d)$ as the new $S(k, i)$.

Figure 7:
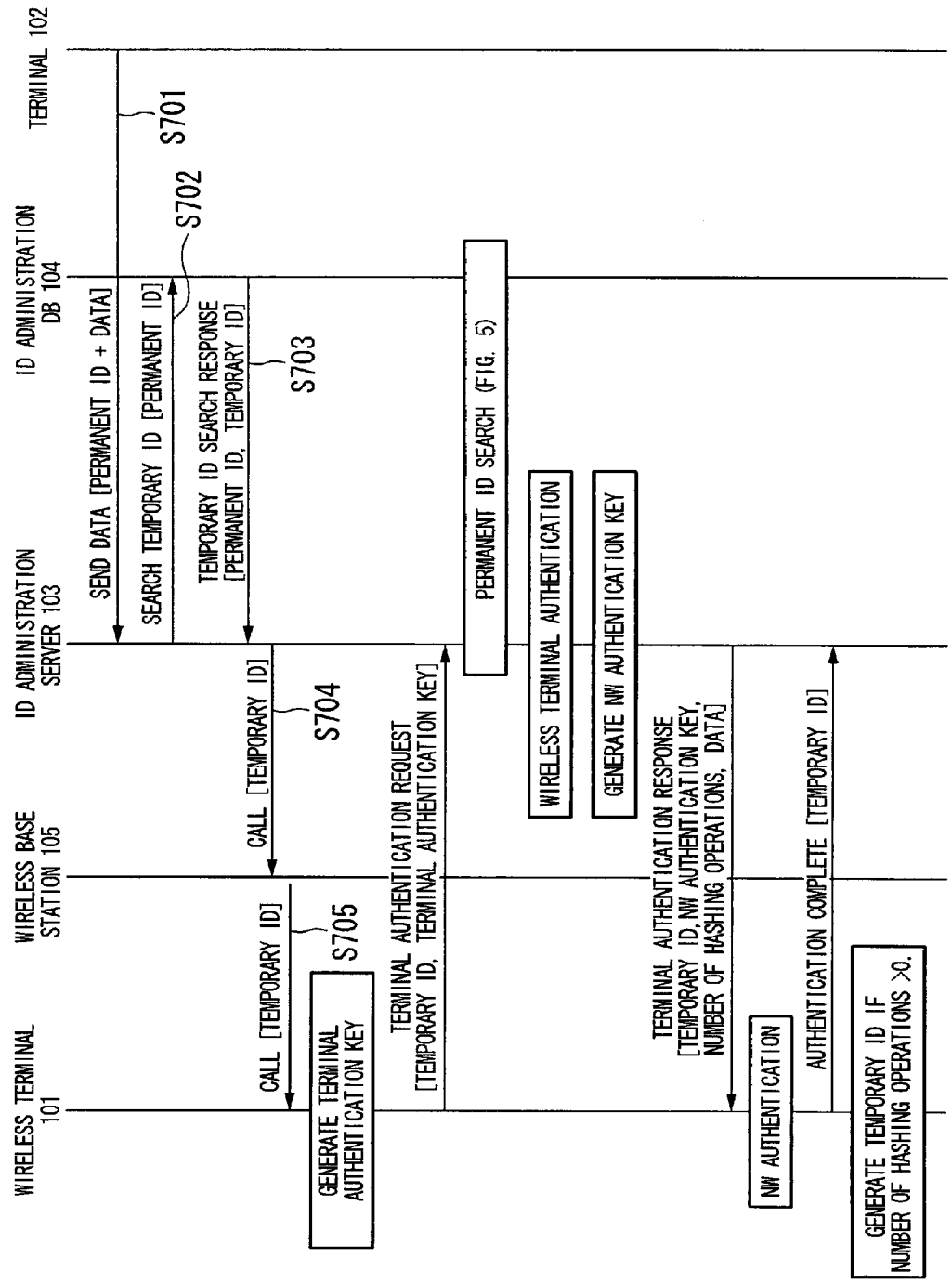
FIG. 7 is a flow chart for explaining the downloading from the terminal in the first embodiment.

Next, a case of downloading data from the terminal 102 to the wireless terminal 101 is shown in FIG. 7. While the procedure is fundamentally the same as that of uploading data, the terminal 102 sends the permanent ID of the wireless terminal 101 which is the destination of sending and data to be transmitted to the ID administration server 103 (step S701). The ID administration server 103 converts the received permanent ID into a temporary ID (steps S702, S703), uses a terminal calling function of the wireless base station 105 (step S704) so as to perform calling using the temporary ID as a parameter (step S705). The wireless terminal 101 which has been called up accesses the terminal 102 in accordance with a procedure similar to that of the uploading of data. The difference between uploading and downloading is where the data is sent together with the terminal authentication request or with the terminal authentication response. It should be noted that in case the ID administration DB 104 stores a plurality of temporary IDs associated with the same permanent ID, the ID administration server 103 must repeat calling with the different temporary IDs until the wireless terminal is successfully called up.

A possible example of the uploading is to send sensor information from the wireless terminal 101 to the terminal 102. When applied to the prevention of crimes, for example, breaking of a window glass triggers the wireless terminal 101 to start the sending so that a security provider detects, by the use of the terminal 102, the incidence in a home equipped with the wireless terminal 101. Such an application may also be conceived that the wireless terminal 101 periodically senses temperatures and sends data to the terminal 102 which in turn regulates the temperature of the environment around the wireless terminal 101 in accordance with the temperature data which has been sent.

Downloading operations include setting of a measurement condition and a measurement method of a sensor wherein it may be set whether on-off switching of the sensor, whether measurement of the sensor are carried out at one-minute intervals or at ten-minute intervals, etc. A threshold of temperature may also be set in case the communication is done when the temperature is higher than a certain level.

It should be noted that the terminal 102, the ID administration server 103, and the ID administration DB 104 are unable to know whether the number of hashing operations has been correctly sent in the terminal authentication response to the wireless terminal. As a result, there is a possibility that the wireless terminal does not generate the temporary ID (i.e. does not execute step S610), and the old temporary ID may be used in the next communication. Therefore, it is prohibited to delete the temporary ID having an associated temporary ID pointer of value −1 stored in the ID administration DB 104 until a temporary ID having an associated temporary ID pointer of value 0 is used (the temporary ID having an associated temporary ID pointer of value −1 is deleted in step S505).

It should also be noted that while the ID administration server 103 and the ID administration DB 104 are described as separate devices in the embodiment described above, the present invention can be applied also to a case where the ID administration server and the ID administration DB are designed as integrated.

Also, in the embodiment described above, a plurality of hashing operations are carried out for the hash seed $S(i)$ with the hash function H (i.e., $S(i+d)$) on both sides of the server (the ID administration server 103 and the ID administration DB 104) and the wireless terminal 101 as shown in FIG. 2, and the result is further hashed with the hash function J to obtain a(i+d) that is used as the temporary ID. However, the hashing operation with the hash function J may be omitted on both the server and the wireless terminal, while using S(i+d) as the temporary ID. In this case, too, it is important to synchronize the number of hashing operations with the hash function H between the server and the terminal.

However, with the above-described simple scheme of omitting the hashing operation by means of the hash function J on both the server and the wireless terminal and using S(i) or S(i+d) as the temporary ID, there is a possibility of allowing it without difficulty to eavesdrop the wireless communication of S(i), which is the temporary ID, and hash the S(i) to guess S(i+d) used as the next temporary ID.

Even in such a case, a temporary ID which makes it difficult for a third party to track the terminals can be generated by modifying the constitution of the function as described below.

For example, assume the function defined as S(i+1)=H(S(i) XOR (i+1)), where H is a hash function that hashes an argument therewith, and XOR is a function that forms exclusive OR of bit strings. Alternatively, for example, assume the function defined as S(i+1)=H(S(0) XOR i). In such constitutions, an XOR process is carried out using the number i which is not transmitted in the wireless section, and a hashing operation is carried out thereafter. As a result, it is difficult to guess S(i+1) which is the next temporary ID, even for a third party who eavesdrop the communication.

Such a constitution is not limited to XOR, and is applicable to other functions. What is important is to apply preprocessing to the current temporary ID using a function involving the number of hashing operations i, which is not transmitted in the wireless section, then hash the temporary ID which has been preprocessed so as to determine the next temporary ID, rather than directly hashing S(i) which is the current temporary ID or the initial value S(k, 0) so as to obtain S(i+1) which is the next temporary ID.

As described above, a temporary ID which is difficult to guess even by eavesdropping can be generated, by applying preprocessing involving the number of hash operations i which is not transmitted in the wireless section to S(i) which is a temporary ID, and then hashing the result so as to determine S(i+1) which is the next temporary ID.

It should be noted that the time of updating the temporary ID stored in the ID administration DB 104 may be changed at various timing, for example at the time when the ID administration server 103 receives a new temporary ID from the wireless terminal 101 in step S602 shown in FIG. 6, or at the time when the ID administration server 103 sends the terminal authentication response toward the wireless terminal 101 in step S606 shown in FIG. 6. Moreover, the time of updating the number of hashing operations stored in the ID administration DB 104 may be changed at various timing, for example, in step S404a shown in FIG. 4.

Moreover, while the above description states that the temporary ID is updated if the condition "current time−last update time of temporary ID>interval of updating temporary ID" is satisfied when there is a terminal authentication request from the wireless terminal 101 as shown in FIG. 6, the temporary ID may also be updated upon lapse of a predetermined period of time, regardless of whether there is a terminal authentication request or not.

Next, a process for correcting a disparity in synchronization between the wireless terminal 101 and the ID administration server 103 will now be described in case the disparity in synchronization cannot be corrected by the procedures described above.

As described above, a disparity in synchronization between the wireless terminal 101 and the ID administration server 103 can be corrected for a single communication. However, in such a case where the content stored in a memory of the wireless terminal 101 is lost for some cause such as the shutdown of the power supply to the wireless terminal 101, the wireless terminal 101 becomes unable to continue its process and correct the disparity in synchronization. Thus, in such a case, the temporary ID is initialized (hereinafter referred to as a temporary ID initialization process) regardless of the status of the wireless terminal 101 and the ID administration server 103, and synchronization is established again between the wireless terminal 101 and the ID administration server 103.

Figure 8:
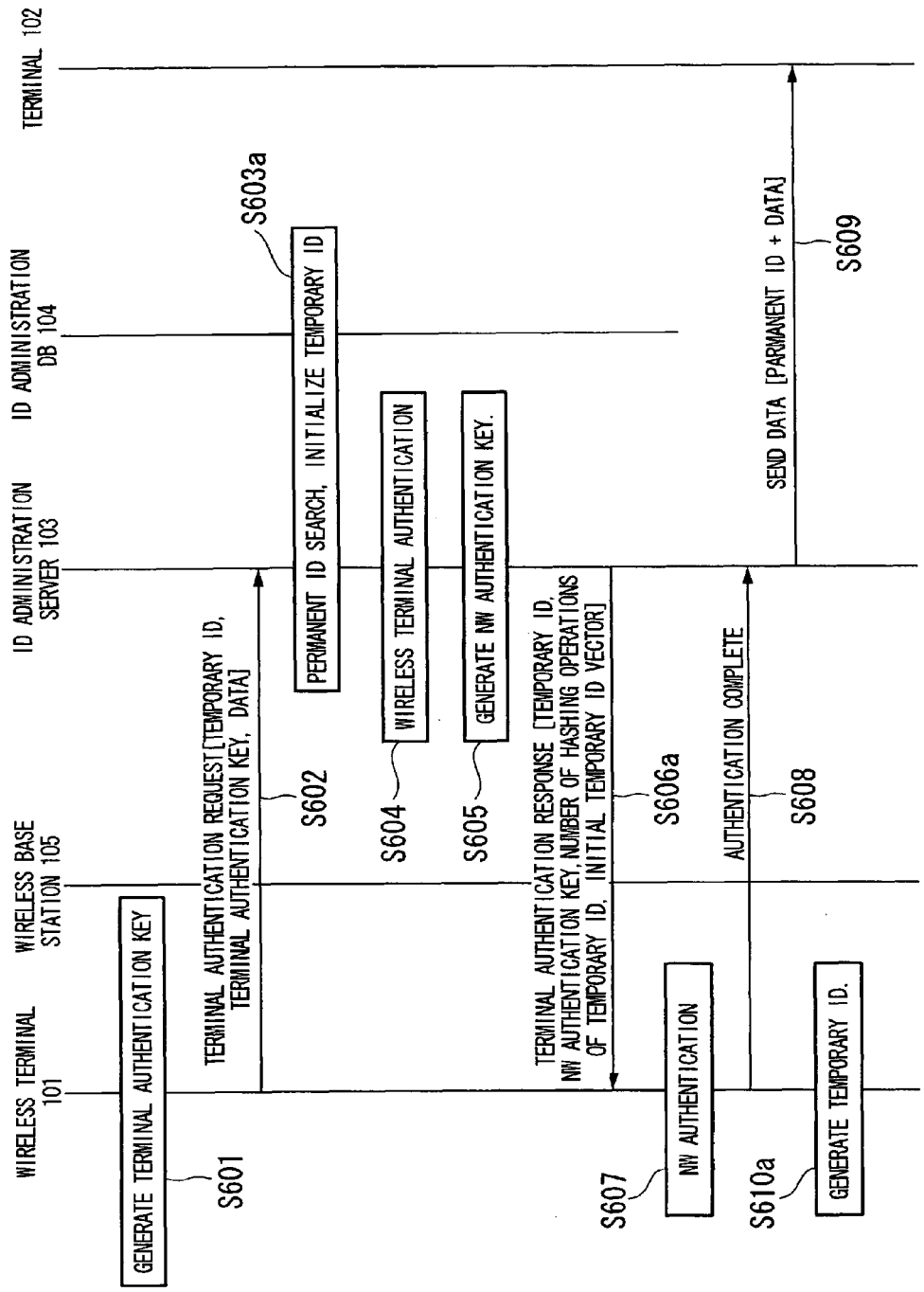
FIG. 8 is a sequence diagram showing a temporary ID initialization process for initializing the temporary ID in the first embodiment.

FIG. 8 shows the sequence of carrying out the temporary ID initialization process which is similar to the sequence shown in FIG. 6, while it is different in that the number of hashing operations of the temporary ID is sent instead of the number of hashing operations in step S606a which corresponds to step S606 of FIG. 6 and the initial temporary ID vector is further sent, and is also different in the procedure of steps S603a and S610a which correspond to steps S603 and S610 of FIG. 6, respectively. It should be noted that the sequence shown in FIG. 8 is carried out also before shipment of the wireless terminal 101.

When the wireless terminal 101 judges that there is a disparity in synchronization with the ID administration server 103, it generates a terminal authentication key (step S601) similarly to FIG. 6, and sends a terminal authentication request carrying parameters of the temporary ID, the terminal authentication key, and data toward the terminal 102 (step S602). It should be noted that cases when the wireless terminal 101 judges that there is a disparity in synchronization include, for example, a case where the wireless terminal 101 is not authenticated as a legitimate terminal by the ID administration server 103, or the wireless terminal 101 detects a trouble such as the loss of memory content of its own. Moreover, for the temporary ID which is sent with the terminal authentication request, a temporary ID (a temporary ID dedicated to the temporary ID initialization process) which has been determined in advance between the wireless terminal 101 and the ID administration server 103 for each of the wireless terminals is used. This temporary ID for initialization is stored in a nonvolatile memory or the like incorporated in the wireless terminal 101, for example, before shipment of the wireless terminal 101. Moreover, for the ID administration DB 104, the temporary ID for initialization is set in advance in the field of the temporary ID for initialization.

The ID administration server 103 determines whether the temporary ID which has been sent with the terminal authentication request agrees with any temporary ID for initialization by making reference to the field of temporary ID for initialization of the ID administration DB 104. When there is one that agrees with the temporary ID which has been sent, the ID administration server 103 acquires the permanent ID which corresponds to the temporary ID for initialization which agrees, and carries out the temporary ID initialization process assuming that the wireless terminal 101 has detected a disparity in synchronization (step S603a).

Figure 9:
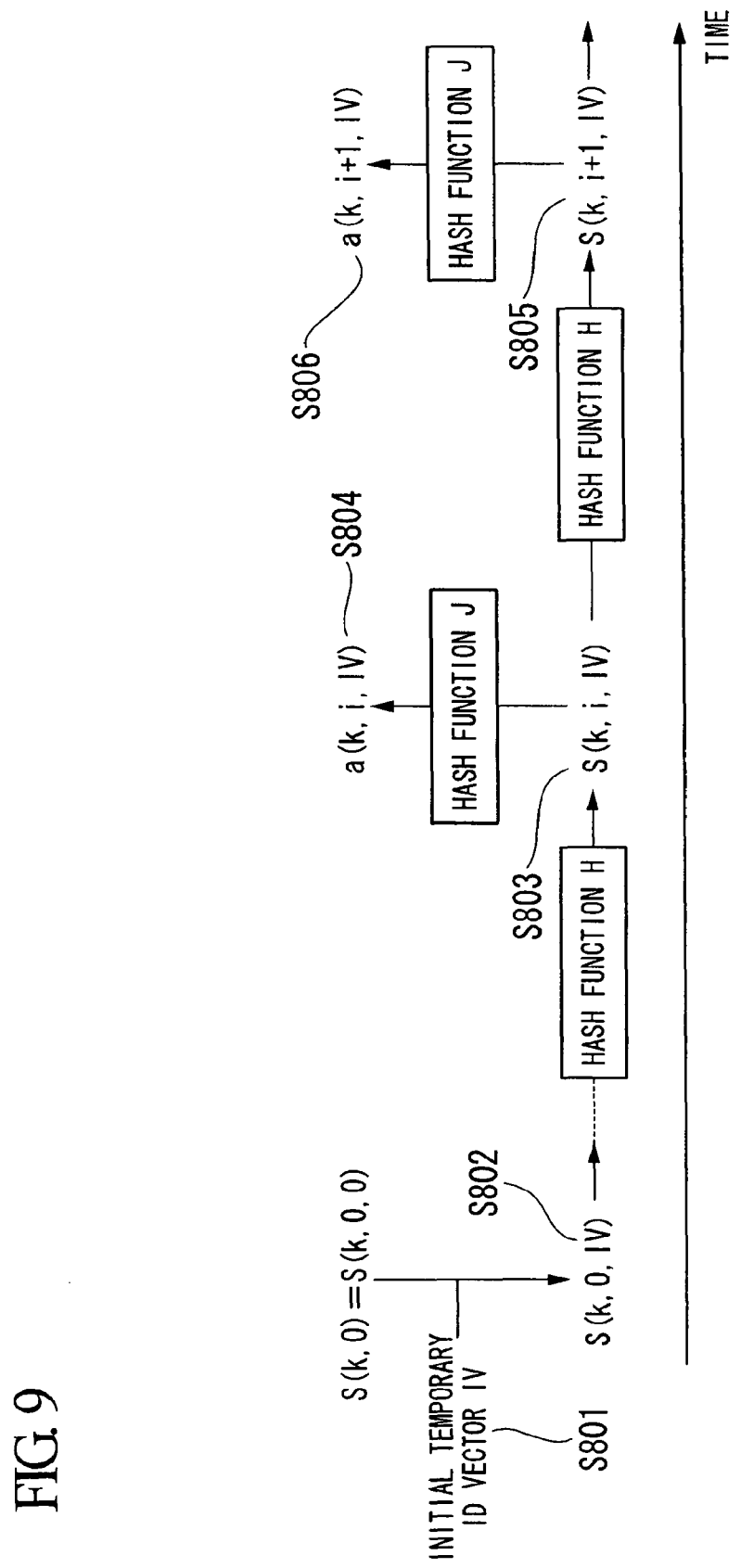
FIG. 9 is an explanatory diagram showing the procedure of calculating the temporary ID using an initial temporary ID vector in the first embodiment.

FIG. 9 shows the procedure of generating the temporary ID in the temporary ID initialization process. First, the ID administration server 103 generates an initial temporary ID vector IV (step S801). At this time, the ID administration server 103 is conditioned to not generate the same initial temporary ID vector IV as those that have been generated. Specifically, the initial temporary ID vector IV may be generated by using a random number, or in such a procedure as setting an initial value of the initial temporary ID vector IV in advance, using the initial value when generating the first temporary ID for initialization and thereafter incrementing the initial temporary ID vector IV by a predetermined value (for example, 1) every time the temporary ID for initialization is generated.

Then the ID administration server 103 generates a hash seed S(k, 0, IV) from an initial hash seed S(k, 0, 0) (same as the initial hash seed S(k, 0) mentioned previously) shared by the wireless terminal 101 and the ID administration server 103 and the initial temporary ID vector IV (step S802). Then the ID administration server 103 hashes the hash seed S(k, 0, IV) i times with the hash function H to determine the hash seed S(k, i, IV) (step S803), and uses a(k, i, IV) obtained by hashing the hash seed S(k, i, IV) with the hash function J as the temporary ID (step S804). It should be noted that the number of hashing operations i is incremented from 1 by 1 until there is no conflict of a(k, i, IV) which is the temporary ID to be generated, similarly to the case described previously.

Next, the ID administration server 103 initializes the entry on the ID administration DB 104 which corresponds to the permanent ID that was obtained previously, namely deletes all the sets of the temporary ID, temporary ID pointer, and the number of hashing operations associated with the permanent ID that has been obtained. The ID administration server 103 also sets a(k, i, IV) in the temporary ID field, 0 in the temporary ID pointer field, the number of hashing operations i in the number of hashing operations field, the time when initialization was done in the temporary ID updating time field, and the hash seed S(k, i, IV) in the hash seed field.

Then, similarly to the case shown in FIG. 6, the ID administration server 103 and the ID administration DB 104 carry out authentication of the wireless terminal and generation of the NW authentication key (steps S604 and S605), and then send a terminal authentication response to the wireless terminal 101 with the temporary ID, the NW authentication key, the number of hashing operations of temporary ID (the number of hashing operations i), and the initial temporary ID vector IV attached to the response (step S606a). The wireless terminal 101, the wireless base station 105, the ID administration server 103, and the terminal 102 then follow the procedures of steps S607 to S609 similarly to the case shown in FIG. 6. Next, the wireless terminal 101 generates S(k, i, IV) and a(k, i, IV) as the hash seed and the temporary ID, respectively, in a procedure similar to that of the ID administration server 103 by using the hash seed S(k, 0, 0) stored in itself, the number of hashing operations of temporary ID and the initial temporary ID vector IV informed with the terminal authentication response (step S610a).

It should be noted that thereafter, the temporary ID to be used next (a NEXT temporary ID) is calculated by hashing the hash seed S(k, i, IV) with the hash function H d times (FIG. 9 shows an example where d is 1) to determine S(k, i+d, IV) (step S805), which is hashed with the hash function J to obtain a(k, i+d, IV) that is used as the NEXT temporary ID (step S806). Moreover, while FIG. 8 shows the procedure of the temporary ID initialization process based on FIG. 6, when there is no data to be uploaded to the terminal 102, it is not necessary to add data to the terminal authentication request as a parameter, and there is no need to send data from the ID administration server 103 to the terminal 102.

Many embodiments of RFID linked to sensors have been described. However, the method according to the present invention is not limited to be applied to RFID linked to sensors, and may be applied to the use of RFID tags for the identification of goods in a distribution system, or to any communication schemes such as cell phones.

In this embodiment, as described above, the number of hashing operations which makes the basis for generating the terminal ID is synchronized (i.e. set to the same value) between the ID administration server 103 in the network 106 and the wireless terminal 101. In addition, when the ID administration server 103 changes the terminal ID, the number of hashing operations is selected so that the changed terminal ID does not conflict with the terminal IDs allocated to other terminals. This ensures that a terminal ID (a temporary ID) which does not conflict with the terminal IDs of other terminals is obtained. Also, because the temporary ID can be synchronized between the network 106 and the wireless terminal 101, the wireless terminal 101 can be identified by means of the dynamically changing temporary ID.

Use of this temporary ID in the communication between the wireless terminal 101 and the ID administration server 103 makes it possible to prevent third parties from tracking the terminals and ensures communications with the terminals where privacy is protected.

Second Embodiment

Figure 10:
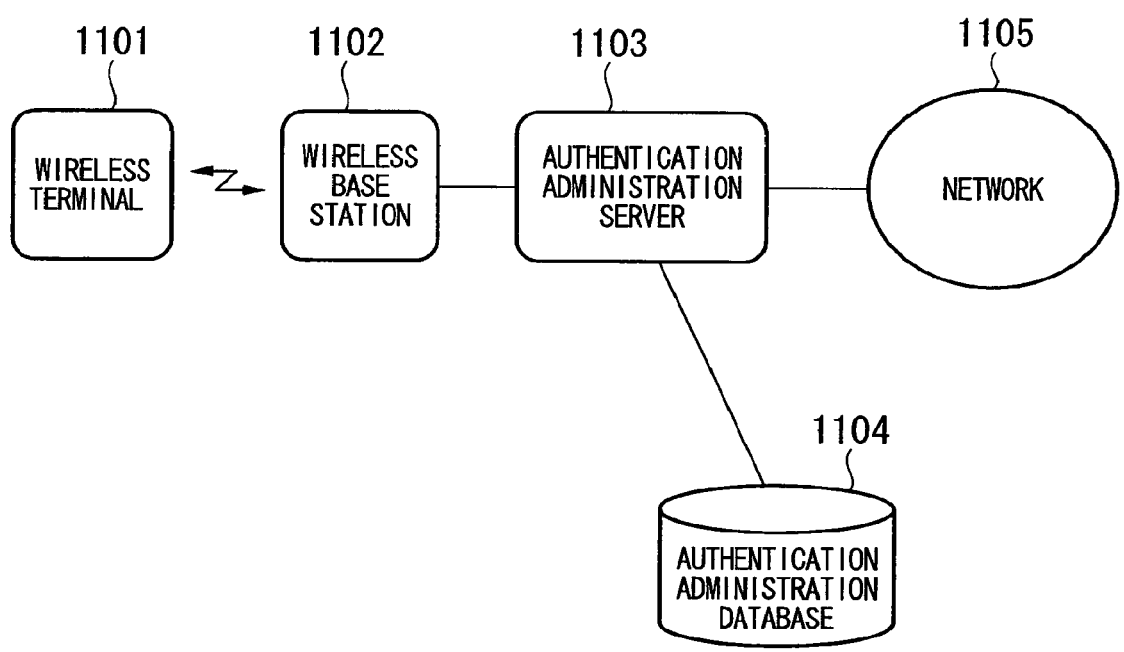
FIG. 10 is a block diagram showing the constitution of an authentication system according a second embodiment.

Next, a second embodiment of the present invention will now be described. FIG. 10 is a block diagram schematically showing the constitution of a system which authenticates wireless terminal according to this embodiment. The authentication system includes a wireless terminal 1101, a wireless base station 1102, an authentication administration server 1103, an authentication administration database 1104, and a network 1105.

The wireless terminal 1101 is connected to the network 1105 via the wireless base station 1102 and the authentication administration server 1103, and is capable of communicating with another terminal or a server (omitted in the drawing) connected to the network 1105. Moreover, the wireless terminal 1101 carries out mutual authentication with the authentication administration server 1103 and, upon completion of the mutual authentication, makes communication with the network 1105 via the authentication administration server 1103. Each wireless terminal 1101 has its own unique terminal ID which enables it to identify each wireless terminal.

The wireless terminal 1101 shares in advance hash functions, authentication information of the wireless terminal 1101, and authentication information of the authentication administration server 1103 with the authentication administration server 1103. The wireless terminal 1101 sends authentication data used in authentication by the authentication administration server 1103 via the wireless base station 1102 to the authentication administration server 1103. Here, the authentication data includes authentication keys calculated using: an authenticating communication parameter selected from among communication parameters related to the wireless communication between the wireless terminal 1101 and the wireless base station 1102; authentication information shared with the authentication administration server 1103 (authentication information of the wireless terminal 1101 or authentication information of the authentication administration server 1103); and the hash functions. The authentication data also includes a terminal ID.

The wireless base station 1102 can be connected to a plurality of wireless terminals 1101 at the same time, and relays communications of authentication data used between the wireless terminal 1101 and the authentication administration server 1103 and data for communication. The wireless base station 1102 also relays the communication by attaching the authenticating communication parameter, which is selected from among the communication parameters related to the wireless communication between the wireless terminal 1101 and the wireless base station 1102, to the authentication data between the wireless terminal 1101 and the authentication administration server 1103. This authenticating communication parameter (communication parameter) is the same as the authenticating communication parameter used by the wireless terminal 1101 in generating the authentication data.

The authentication administration server 1103 is connected to the wireless base station 1102, the authentication administration database 1104, and the network 1105. The authentication administration server 1103 may be connected to a plurality of wireless base stations 1102.

The authentication administration server 1103 also receives authentication data from the wireless terminal 1101 via the wireless base station 1102.

Moreover, the authentication administration server 1103 shares in advance the hash functions, the authentication information of the wireless terminal 1101, and the authentication information of the authentication administration server 1103 with the wireless terminal 1101. Furthermore, the authentication administration server 1103, upon receipt of the authentication data from the wireless terminal 1101, reads out the authentication information (the authentication information of the wireless terminal 1101 and the authentication information of the authentication administration server 1103), which is required to authenticate the wireless terminal 1101, from the authentication administration database 1104 as required, based on the terminal ID included in the received authentication data.

Here, not only the authentication information of the wireless terminal 1101 but also the authentication information of the authentication administration server 1103 has unique value for each terminal, and therefore the authentication administration server 1103 reads out the authentication information of the wireless terminal 1101 and the authentication information of the authentication administration server 1103 from the authentication administration database 1104, before generating the network authentication key.

The authentication administration server 1103 authenticates the wireless terminal 1101 based on the authentication data, the authenticating communication parameter attached by the wireless base station 1102, the authentication information common with the wireless terminal 1101 (the authentication information of the wireless terminal 1101 or the authentication information of the authentication administration server 1103), and the hash functions.

The authentication administration database 1104 is connected to the authentication administration server 1103. Moreover, the authentication administration database 1104 stores the authentication information between the authentication administration server 1103 and the wireless terminal 1101 (the authentication information of the wireless terminal 1101 and the authentication information of the authentication administration server 1103) by relating it to the terminal ID of the wireless terminal 1101. The authentication information differs from wireless terminal 1101 to wireless terminal 1101, and is common with the authentication information stored by the wireless terminal 1101 (the authentication information of the wireless terminal 1101 and the authentication information of the authentication administration server 1103).

It should be noted that the wireless terminal 1101 and the wireless base station 1102 are connected with each other by wireless communication so that, as the wireless terminal 1101 moves, the wireless base station 1102 to which the wireless terminal 1101 is connected is switched from one to the other. For example, connection of the wireless terminal 1101 is switched to a wireless base station 1102 which is nearest to the wireless terminal 1101, or to a wireless base station 1102 which provides the optimum condition for wireless communication to the wireless terminal 1101.

It should be noted that the authentication administration server 1103 and the authentication administration database 1104 may be either separate devices or integrated into one device.

Next, an example of procedure of mutual authentication scheme carried out through exchange of authentication messages between the wireless terminal 1101 and the authentication administration server 1103 in the embodiment shown in FIG. 10 will now be described with reference to FIG. 11. The wireless base station 1102 is not depicted in FIG. 11 because the wireless base station 1102 simply relays authentication messages between the wireless terminal 1101 and the authentication administration server 1103.

First, assume the initial condition in which the wireless terminal 1101 and the authentication administration server 1103 share in advance, as secret information, terminal authentication information $f0(n)$ which is the authentication information of the wireless terminal 1101 and network authentication information $g0(n)$ which is the authentication information of the authentication administration server 1103. That is, the wireless terminal 1101 has terminal authentication information $f0(n)$ and the network authentication information $g0(n)$ of itself, and the authentication administration server 1103 has the terminal authentication information $f0(n)$ and the network authentication information $g0(n)$ used by the wireless terminal along with the terminal ID for each wireless terminal. It should be noted that the terminal authentication information $f0(n)$ and the network authentication information $g0(n)$ may or may not be the same information. However, in case the contents of the terminal authentication information and the network authentication information are the same, it is necessary to change the calculation for generating the authentication keys (a terminal authentication key and a network authentication key) from these pieces of authentication information between the case of terminal authentication and the case of network authentication. In the case shown in FIG. 11, for example, different calculation is carried out for the hash function H and the hash function G. This is because, if the authentication keys are generated from the authentication information by the same calculation in the case of terminal authentication and in the case of network authentication, the terminal authentication key and the network authentication key become identical which allows it to send the authentication key as it has been received, thus making it impossible to carry out mutual authentication.

Moreover, the wireless terminal 1101 and the wireless base station 1102 share common communication parameters for communication that vary with time or with the terminal location which will be described later.

Furthermore, in the above description, n is the terminal ID for identifying the wireless terminal 1101, G and H are hash functions, and t is an authentication parameter.

In addition, $f0(n)$ described above is terminal authentication information of a terminal of which ID is n, and $g0(n)$ is the network authentication information of a terminal of which ID is n.

Moreover, $f1(n, t)$ to be described later is a terminal authentication key generated by the wireless terminal 1101 of which ID is n based on the authentication parameter t, the terminal authentication information $f0(n)$, and the hash function F.

Furthermore, $f2(n, t)$ to be described later is a terminal authentication key generated by the authentication administration server 1103 for the terminal of which ID is n based on the authentication parameter t, the terminal authentication information f0($n$), and the hash function F.

In addition, g1($n$, $t$) to be described later is a network authentication key generated by wireless terminal 1101 of which ID is n based on the authentication parameter t, the network authentication information g0($n$), and the hash function G. It should be noted that the hash function G may or may not be the same as the hash function F.

Moreover, g2($n$, $t$) to be described later is a network authentication key generated by the authentication administration server 1103 for the terminal of which ID is n based on the authentication parameter t, the network authentication information g0($n$) and the hash function G.

First, during authentication, the wireless terminal 1101 starts wireless communication with the wireless base station 1102. At this time, the wireless terminal 1101 and the wireless base station 1102 have common communication parameters for the wireless communication therebetween. The wireless terminal 1101 selects a particular communication parameter which has been predetermined from among the communication parameters as the authenticating communication parameter. Assume here that two selected communication parameters are authenticating communication parameters 1 and 2. It should be noted that while description that follows deals with an example of using these two authenticating communication parameters, one or any number of authenticating communication parameters may be used.

The communication parameters and the authenticating communication parameter will be described in detail later.

Next, the wireless terminal 1101 generates the authentication parameter t from the authenticating communication parameters 1 and 2 (step Sa1). The wireless terminal 1101 then generates a terminal authentication key f1($n$, $t$) by a calculation using the hash function F based on the authentication parameter t which has been generated and the terminal authentication information f0($n$) (step Sa2), and sends the terminal authentication key f1($n$, $t$) to the authentication administration server 1103 (step Sa3). The method for generating the authentication parameter t and the terminal authentication key f1($n$, $t$) will be described in detail later.

The wireless base station 1102 relays the terminal authentication key f1($n$, $t$) which is sent from the wireless terminal 1101 toward the authentication administration server 1103. When relaying the terminal authentication key f1($n$, $t$), the wireless base station 1102 uses two particular communication parameters related to the wireless communication between the wireless terminal 1101 and the wireless base station 1102 as the authenticating communication parameters (the authenticating communication parameters 1 and 2), and these authenticating communication parameters (authenticating communication parameters 1 and 2) are appended to the terminal authentication key f1($n$, $t$) and sent to the authentication administration server 1103.

Here, the communication parameters used as the authenticating communication parameters between the wireless terminal 1101 and the wireless base station 1102 are common to both sides and can be referred to at least during transmission of the terminal authentication key f1($n$, $t$) between the wireless terminal 1101 and the wireless base station 1102. That is, what is important is that the communication parameters used as the authenticating communication parameters can be referred to commonly by the wireless terminal and the wireless base station when the terminal authentication key is transmitted, and it is not necessary that the communication parameters remain unchanged during transmission. For example, the communication parameters may change as long as they are stored in memory or the like.

Then the authentication administration server 1103 generates the authentication parameter t from the authenticating communication parameters (authenticating communication parameters 1 and 2) which have been received (step Sb1). The authentication administration server 1103 then generates the terminal authentication key f2($n$, $t$) by a calculation using the hash function F based on the authentication parameter t which has been generated and the terminal authentication information f0($n$) held by the authentication administration server 1103 (step Sb2). Subsequently, the authentication administration server 1103 judges whether the terminal authentication key f1($n$, $t$) which has been received and the terminal authentication key f2($n$, $t$) which has been generated are identical, and if the judgment result indicates that they are identical, the authentication administration server 1103 authenticates the wireless terminal 1101 as a legitimate wireless terminal with which the authentication administration server 1103 shares the secret information.

This completes the authentication of the wireless terminal 1101 by the authentication administration server 1103.

Moreover, the authentication administration server 1103 again generates the authentication parameter t from the authenticating communication parameters (authenticating communication parameters 1 and 2) which have been received (step Sc1). Then the authentication administration server 1103 generates a network authentication key g2($n$, $t$) by a calculation using the hash function G based on the authentication parameter t which has been generated and the network authentication information g0($n$) (step Sc2), and sends the network authentication key g2($n$, $t$) to the wireless base station 1102 addressing the wireless terminal 1101 (step Sc3).

The wireless base station 1102 sends the network authentication key g2($n$, $t$), which has been sent from the authentication administration server 1103, to the wireless terminal 1101.

Upon receipt of the network authentication key g2($n$, $t$), the wireless terminal 1101 generates the authentication parameter t from the authenticating communication parameters (authenticating communication parameters 1 and 2) used when generating the terminal authentication key f1($n$, $t$) (step Sd1). Then the wireless terminal 1101 generates a network authentication key g1($n$, $t$) by a calculation using the hash function G based on the authentication parameter t which has been generated and the network authentication information g0($n$) held by the wireless terminal 1101 (step Sd2). Then the wireless terminal 1101 judges whether the network authentication key g1($n$, $t$) which has been generated and the network authentication key g2($n$, $t$) which has been received are identical, and if the judgment result indicates that they are identical, the wireless terminal 1101 authenticates the authentication administration server 1103 as a legitimate authentication administration server with which the wireless terminal 1101 shares the secret information.

This completes the authentication of the authentication administration server 1103 by the wireless terminal 1101.

Subsequently, the wireless terminal 1101 sends information indicating that the authentication of the authentication administration server 1103 by the wireless terminal 1101 is completed to the authentication administration server 1103. Receipt of this information by the authentication administration server 1103 completes the mutual authentication between the wireless terminal 1101 and the authentication administration server 1103.

It should be noted that in the foregoing explanation, when carrying out authentication, the wireless terminal 1101 starts wireless communication with the wireless base station 1102, while the wireless terminal 1101 and the wireless base station 1102 have common communication parameters related to the wireless communication therebetween, the wireless terminal 1101 selects particular communication parameters which have been predetermined from among the communication parameters as the authenticating communication parameters, and uses the two selected communication parameters as authenticating communication parameter 1 and 2. However, the method for acquiring the authenticating communication parameter is not limited to this.

For example, the wireless base station 1102 periodically notifies the wireless terminal 1101 of the communication parameters for the wireless connection with the wireless terminal 1101. The wireless terminal 1101 may hold the communication parameters notified by the wireless base station 1102 and use the communication parameters held therein as the authenticating communication parameters.

Also, as the wireless terminal 1101 moves, the wireless terminal 1101 may acquire the communication parameters for the wireless communication from the wireless base station 1102, and use the communication parameters thus acquired as the authenticating communication parameters.

As described above, the wireless terminal 1101 and the wireless base station 1102 share the common communication parameters, and the wireless terminal 1101 acquires the authenticating communication parameters from among the common communication parameters. Also, the communication parameters used by the wireless terminal 1101 and the wireless base station 1102 are common to both sides and can be referred to at least during transmission of the terminal authentication key $f1(n, t)$ between the wireless terminal 1101 and the wireless base station 1102. That is, as described above, what is important is that the communication parameters used as the authenticating communication parameters can be referred to commonly by the wireless terminal and the wireless base station when the terminal authentication key is transmitted, and it is not necessary that the communication parameters remain unchanged during transmission.

Figure 11:
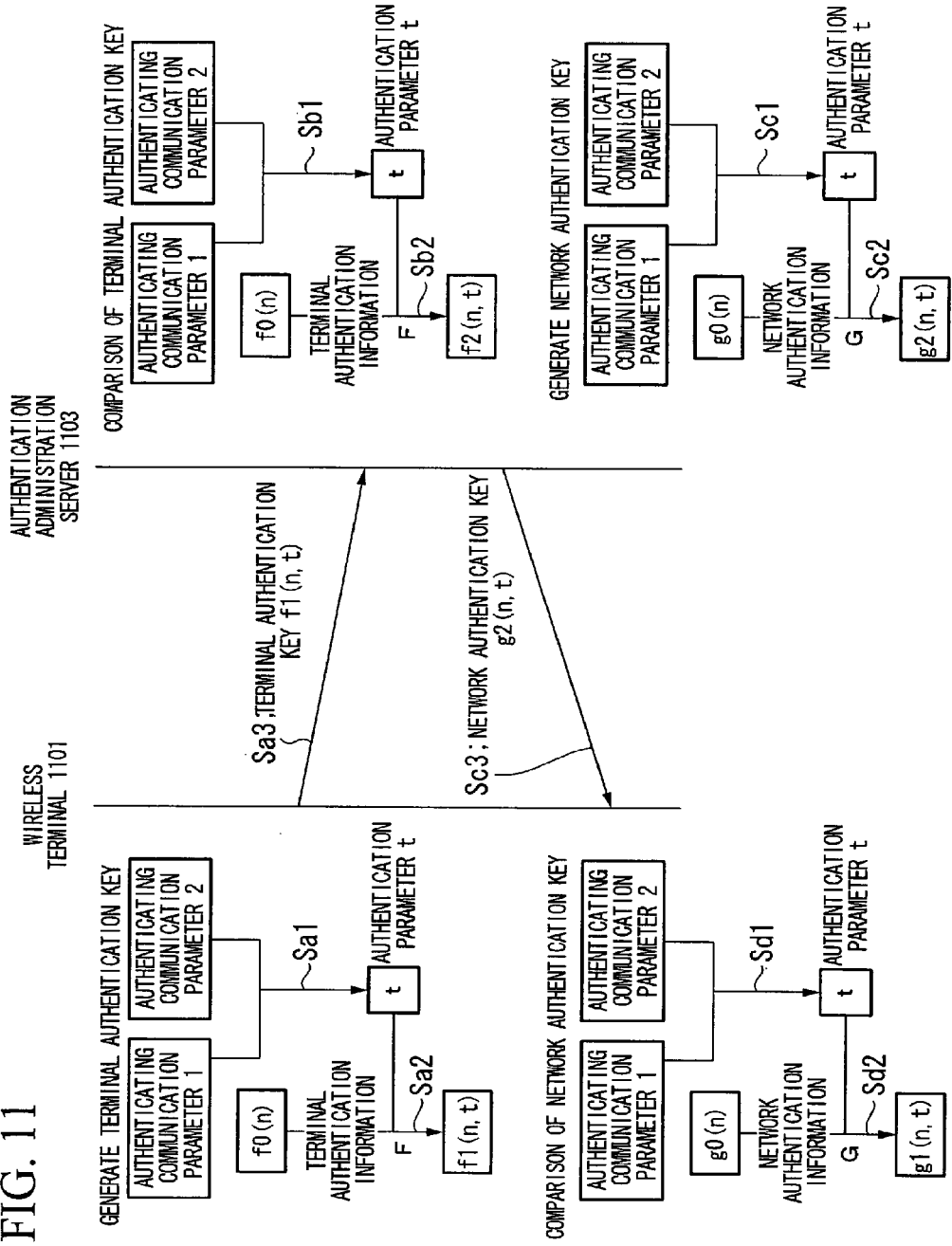
FIG. 11 is an explanatory diagram outlining an authentication method with a wireless terminal 1101 and an authentication administration server 1103 according to the second embodiment.

It should be noted that while the description related to FIG. 11 assumes that the wireless terminal 1101 and the authentication administration server 1103 generate the authentication parameter t from the authenticating communication parameters 1 and 2 in steps Sc1 and step Sd1, respectively, the authentication parameter t may not necessarily be generated.

For example, because the authentication parameter t generated in step Sa1 is identical to the authentication parameter t generated in step Sd1, the wireless terminal 1101 may hold the authentication parameter t which is generated in step Sa1, and use the authentication parameter t thus held in step Sd2.

Similarly, because the authentication parameter t generated in step Sb1 is identical to the authentication parameter t generated in step Sc1, the authentication administration server 1103 may hold the authentication parameter t which is generated in step Sb1, and use the authentication parameter t thus held in step Sc2.

Next, an outline of the method for generating the terminal authentication key f(n, t) ($f1(n, t)$ or $f2(n, t)$) for the authentication of the wireless terminal 1101 by the authentication administration server 1103 (terminal authentication) shown in FIG. 11 will now be described. The terminal authentication key f(n, t) is generated by the wireless terminal 1101 and by the authentication administration server 1103.

First, the wireless terminal 1101 or the authentication administration server 1103 acquires the authenticating communication parameters 1 and 2, and generates the authentication parameter t by a calculation, e.g., an exclusive-OR operation, based on these authenticating communication parameters. Then the wireless terminal 1101 or the authentication administration server 1103 generates the terminal authentication key f(n, t) using the hash function F based on the terminal authentication information $f0(n)$ and the authentication parameter t.

Next, an outline of the method for generating the network authentication key g(n, t) ($g1(n, t)$ or $g2(n, t)$) for the authentication of the authentication administration server 1103 by the wireless terminal 1101 (network authentication) will now be described. The network authentication key g(n, t) is generated by the wireless terminal 1101 and the authentication administration server 1103.

The wireless terminal 1101 or the authentication administration server 1103 generates the network authentication key g(n, t) by a calculation using the hash function G based on the network authentication information $g0(n)$ and the authentication parameter t used in terminal authentication.

Here, for the hash function F and the hash function G used for generating the authentication key, SHA-1 (secure hash algorithm-1) or the like can be used.

Here, in the process of generating the terminal authentication key f(n, t) and the network authentication key g(n, t) described above, it is necessary that the wireless terminal 1101 and the authentication administration server 1103 hold the same authentication parameter t. In this embodiment, in order to reduce the wireless bandwidth, decrease the power consumption of the wireless communication, and provide wide variations of the authentication parameter t, information (communication parameters) for wireless connection which is already shared by the wireless terminal 1101 and the wireless base station 1102, which are devices respectively provided at both ends of a wireless connection section, is used as the authenticating communication parameter for generating the authentication parameter t.

In this embodiment, two communication parameters, i.e., a wireless terminal identifier (MAC (Media Access Control)-terminal ID) and a frame number, are used as the authenticating communication parameters 1 and 2 for generating the authentication parameter t.

The wireless terminal identifier (MAC-terminal ID) is an identifier used to identify the link established between the wireless terminal 1101 and the wireless base station 1102. Even the same wireless terminal may be given different MAC-terminal ID depending on the timing of reestablishing the link. Frame number is a number given to a unit of transmission and reception of data called frame, which changes every time transmission and reception of data is performed.

Both the wireless terminal identifier (MAC-terminal ID) and the frame number are communication parameters which vary with time. Communication parameters which vary with time also include a slot number, clock information, etc. The slot number and the clock information may also be used as the authenticating communication parameters 1 and 2.

It should be noted that not only the communication parameters which vary with time, those which vary as the terminal moves may also be used as the authenticating communication parameter (communication parameter) for generating the authentication parameter t. For example, an identifier of the wireless base station, an identifier of a paging area, the number of terminal groups serviced by the wireless base station, and the number of communication carriers provided by the wireless base station may also be used.

Moreover, an index indicating the communication congestion condition notified by the wireless base station, a terminal group number to which the terminal belongs, the number of a communication carrier with which the terminal is in communication or the like may also be used as the authenticating communication parameter (communication parameter) for generating the authentication parameter t.

The identifier of the wireless base station referred to herein is a piece of information used by the wireless terminal to uniquely identify the wireless base station. For example, when the wireless terminal moves into a service area of a different wireless base station, the wireless terminal knows the movement by a change in the identifier of the wireless base station notified by the wireless base station.

Moreover, the identifier of paging area is a piece of information used by the wireless terminal to uniquely identify the paging area which is formed by a group of wireless base stations. For example, when the wireless terminal moves into a different paging area, the wireless terminal knows the movement by a change in the identifier of the paging area notified by the wireless base station.

Here, the paging area refers to a group of a plurality of adjoining wireless base stations. For example, the wireless terminal does not register the position thereof every time it moves from the service area of a wireless base station to the service area of another wireless base station. Instead, the wireless terminal registers the position thereof when it moves from a paging area, which is a group of a plurality of wireless base stations, to another paging area, which is another group of a plurality of wireless base stations, so as to reduce the number of communications required to register the position.

The number of terminal groups serviced by the wireless base station refers to information that indicates the total number of terminal groups in case the wireless terminals are divided into a plurality of groups. For example, the wireless base station is made possible to notify respective terminal groups of the identifiers of paging areas having different borders.

Moreover, the number of communication carriers provided by the wireless base station refers to information that indicates the number of communication carriers which can be used by the wireless base station and the wireless terminal for communicating control information and data. For example, when there are a plurality of communication carriers provided by the wireless base station, the wireless base station or the wireless terminal selects a communication carrier to be used.

The index indicating the communication congestion condition notified by the wireless base station refers to information of an index that indicates the congestion condition of communications handled by the wireless base station. For example, the wireless terminal can use this information to select a communication carrier when starting communication for control information and data.

Moreover, the terminal group number to which the terminal belongs refers to the number to identify a terminal group when the paging area serviced by the wireless base station is divided into areas corresponding to respective terminal groups.

Furthermore, the number of the communication carrier with which the terminal is in communication refers to an identification number assigned to the communication carrier used by the wireless terminal when the wireless terminal communicates control information and data with the wireless base station.

Figure 12:
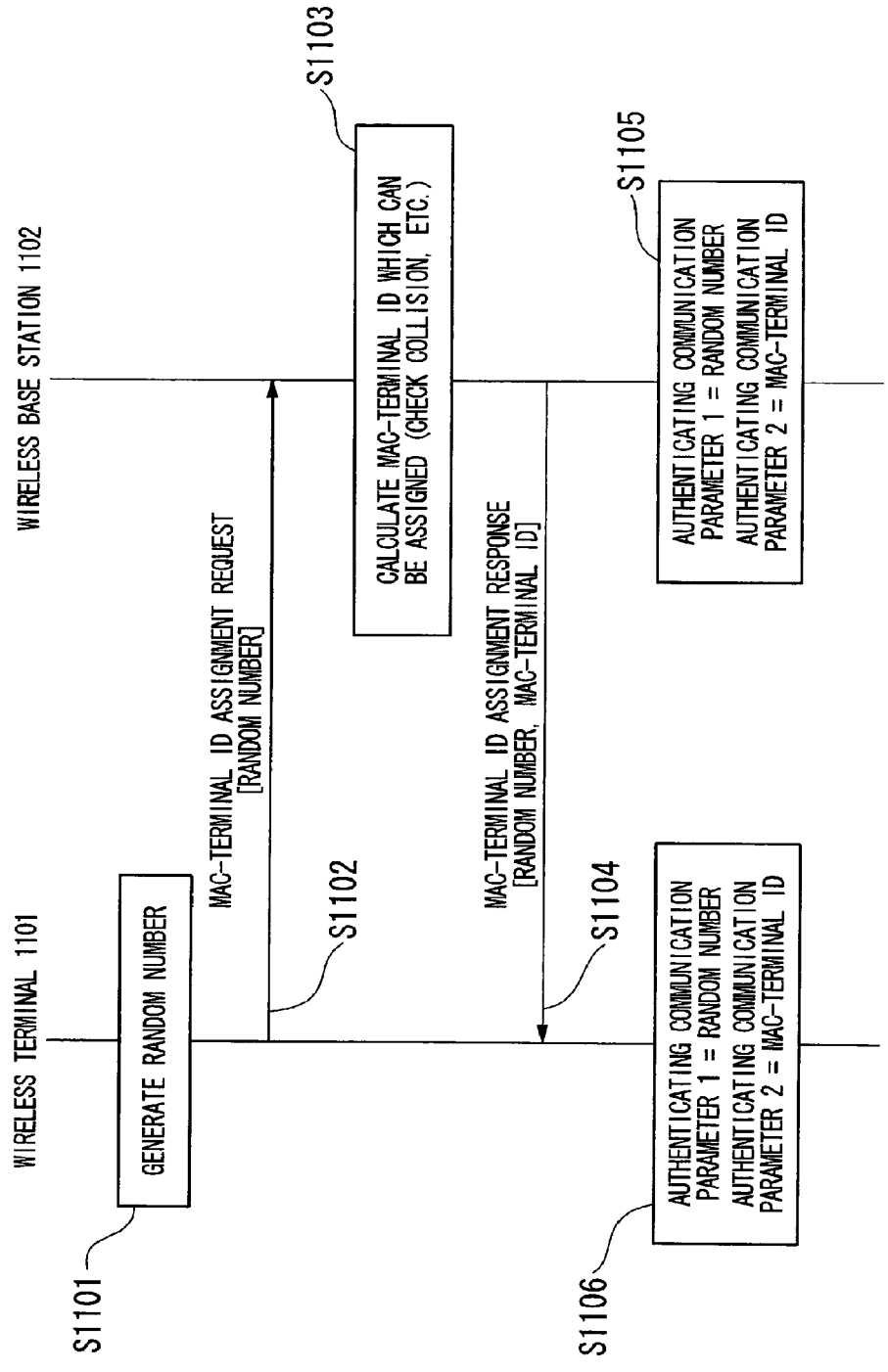
FIG. 12 is a sequence diagram showing the procedure of deriving authenticating communication parameters using a random number and a MAC-terminal ID in the second embodiment.

In addition, a random number and a MAC-terminal ID may be used as the authenticating communication parameters 1 and 2. FIG. 12 is a diagram showing the sequence of the procedure for deriving the authenticating communication parameter in this case. First, the wireless terminal 1101 generates a random number (step S1101) and attaches the generated random number to a MAC-terminal ID assignment request and sends them to the wireless base station 1102 (step S1102). The wireless base station 1102 checks for collision with a MAC-terminal ID that has already been assigned to another wireless terminal, and calculates the MAC-terminal ID which can be assigned to the wireless terminal 1101 (step S1103). The wireless base station 1102 then attach the random number received from the wireless terminal 1101 and the MAC-terminal ID which has been calculated to a MAC-terminal ID assignment response, and sends them to the wireless terminal 1101 (step S1104), so that the random number and the MAC-terminal ID thus sent are determined as the authenticating communication parameters 1 and 2, respectively (step S1105). The wireless terminal 1101 receives the MAC-terminal ID assignment response and determines that the random number and the MAC-terminal ID which are attached to the MAC-terminal ID assignment response as the authenticating communication parameters 1 and 2, respectively (step S1106).

It should be noted that the process shown in FIG. 12 is based on an MAC-terminal ID assignment process. In the MAC-terminal ID assignment process, the wireless base station assigns a MAC-terminal ID to the wireless terminal. Moreover, the MAC-terminal ID assignment process is carried out every time one-to-one communication is made between the wireless terminal and the wireless base station for communicating control information or the like using a wireless section, regardless of whether authentication is done or not. Therefore, by setting the authenticating communication parameters 1 and 2 during the assignment process, it is made unnecessary to generate a random number anew for the purpose of authentication and send it to the wireless terminal.

It should be noted that in case communication is carried out between the wireless terminal and the wireless base station after completing the MAC-terminal ID assignment process, the wireless base station assigns sending and receiving slots and uses a broadcasting control channel to notify the wireless terminal of the MAC-terminal ID and the positions of the slots.

Moreover, there may be a case where the wireless base station is unaware of the timing of communications from the wireless terminal to the wireless base station. In such a case, the wireless terminal uses a random access region to send a slot assignment request with a MAC-terminal ID. Any wireless terminal can use the random access region to carry out the sending, and messages or the like which have been sent are discarded in the case of collision of the sending between the wireless terminals. A MAC-terminal ID assignment request is also made by using the random access region.

In this way, in this embodiment, what is important is that the authentication parameter t is generated from the information (communication parameters) for the wireless connection which is already shared by the wireless terminal 1101 and the wireless base station 1102, which are devices respectively provided at both ends of a wireless connection section, and the information which is shared for the wireless connection has wide variation depending on the time and position.

Moreover, since the information (communication parameters) for wireless connection is already shared by the wireless terminal 1101 and the wireless base station 1102, which are devices respectively provided at both ends of the wireless connection section, by generating the authentication parameter t using such already shared information (communication parameters) as the authenticating communication parameters (e.g., the authenticating communication parameter 1 and 2), as described below, it is made possible to realize mutual authentication between the wireless terminal 1101 and the authentication administration server 1103 with three messages.

The wireless terminal 1101 and the authentication administration server 1103 will now be described in more detail with reference to FIG. 13 and FIG. 14.

Figure 13:
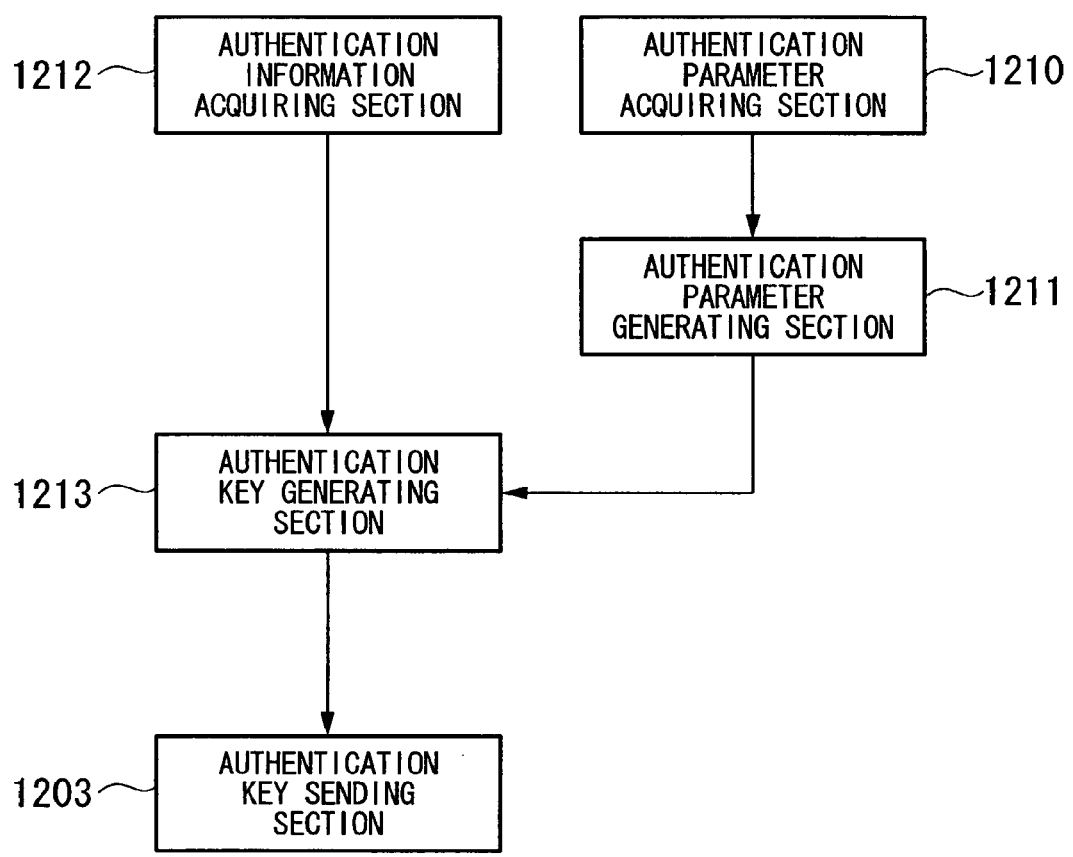
FIG. 13 is a functional block diagram showing the constitution of the wireless terminal 1101 which requests authentication in the second embodiment.

In FIG. 13, the wireless terminal 1101 has an authentication parameter acquiring section 1210, an authentication parameter generating section 1211, an authentication information acquiring section 1212, an authentication key generating section 1213, and an authentication key sending section 1203.

The authentication parameter acquiring section 1210 selects and acquires an authenticating communication parameter from among communication parameters of the communication between the wireless terminal 1101 and the wireless base station 1102 for sending an authentication request. Communication parameters selected as the authenticating communication parameter are, for example, the wireless terminal identifier (MAC-terminal ID) and the frame number. It is assumed here for the purpose of illustration, that two communication parameters which the authentication parameter acquiring section 1210 selects and acquires are authenticating communication parameters 1 and 2.

The authentication parameter generating section 1211 generates the authentication parameter t from the authenticating communication parameters 1 and 2 which the authentication parameter acquiring section 1210 has acquired.

The authentication information acquiring section 1212 acquires the authentication information held by the wireless terminal 1101 (authentication information of the wireless terminal 1101).

The authentication key generating section 1213 generates an authentication key using a hash function based on the authentication parameter t generated by the authentication parameter generating section 1211 and the authentication information acquired by the authentication information acquiring section 1212.

The authentication key sending section 1203 sends terminal authentication request information including the authentication key generated by the authentication key generating section 1213 and the terminal ID for identifying the wireless terminal 1101, to the authentication administration server 1103.

Next, the function of the authentication administration server 1103 which carries out authentication will now be described with reference to the functional block diagram shown in FIG. 14. The authentication administration server 1103 has an authentication key receiving section 1301, an authentication parameter acquiring section 1310, an authentication parameter generating section 1311, an authentication information acquiring section 1312, an authentication key generating section 1313, an authentication key acquiring section 1302, and an authentication section 1303.

The authentication key receiving section 1301 receives the terminal authentication request information which is sent from the wireless terminal 1101 and relayed by the wireless base station 1102. Here, the terminal authentication request information which the authentication key receiving section 1301 receives includes an authentication key and a terminal ID sent from the wireless terminal 1101, and authenticating communication parameters (authenticating communication parameters 1 and 2) selected from among the communication parameters related to the wireless communication between the wireless terminal 1101 and the wireless base station 1102 that are added to the terminal authentication request information by the wireless base station 1102.

The authentication parameter acquiring section 1310 extracts the authenticating communication parameters (authenticating communication parameters 1 and 2) from the terminal authentication request information received by the authentication key receiving section 1301.

The authentication parameter generating section 1311 generates the authentication parameter t from the authenticating communication parameters (authenticating communication parameters 1 and 2) extracted by the authentication parameter acquiring section 1310.

The authentication information acquiring section 1312 acquires relevant authentication information (authentication information of the wireless terminal 1101) from the authentication administration database 1104 based on the terminal ID received by the authentication key receiving section 1301.

The authentication key generating section 1313 generates an authentication key by a calculation using a hash function based on the authentication parameter t generated by the authentication parameter generating section 1311 and the authentication information acquired by the authentication information acquiring section 1312.

The authentication key acquiring section 1302 extracts an authentication key from the terminal authentication request information received by the authentication key receiving section 1301.

The authentication section 1303 authenticates the wireless terminal 1101 by judging whether the authentication key generated by the authentication key generating section 1313 agrees with the authentication key extracted by the authentication key acquiring section 1302.

Figure 15:
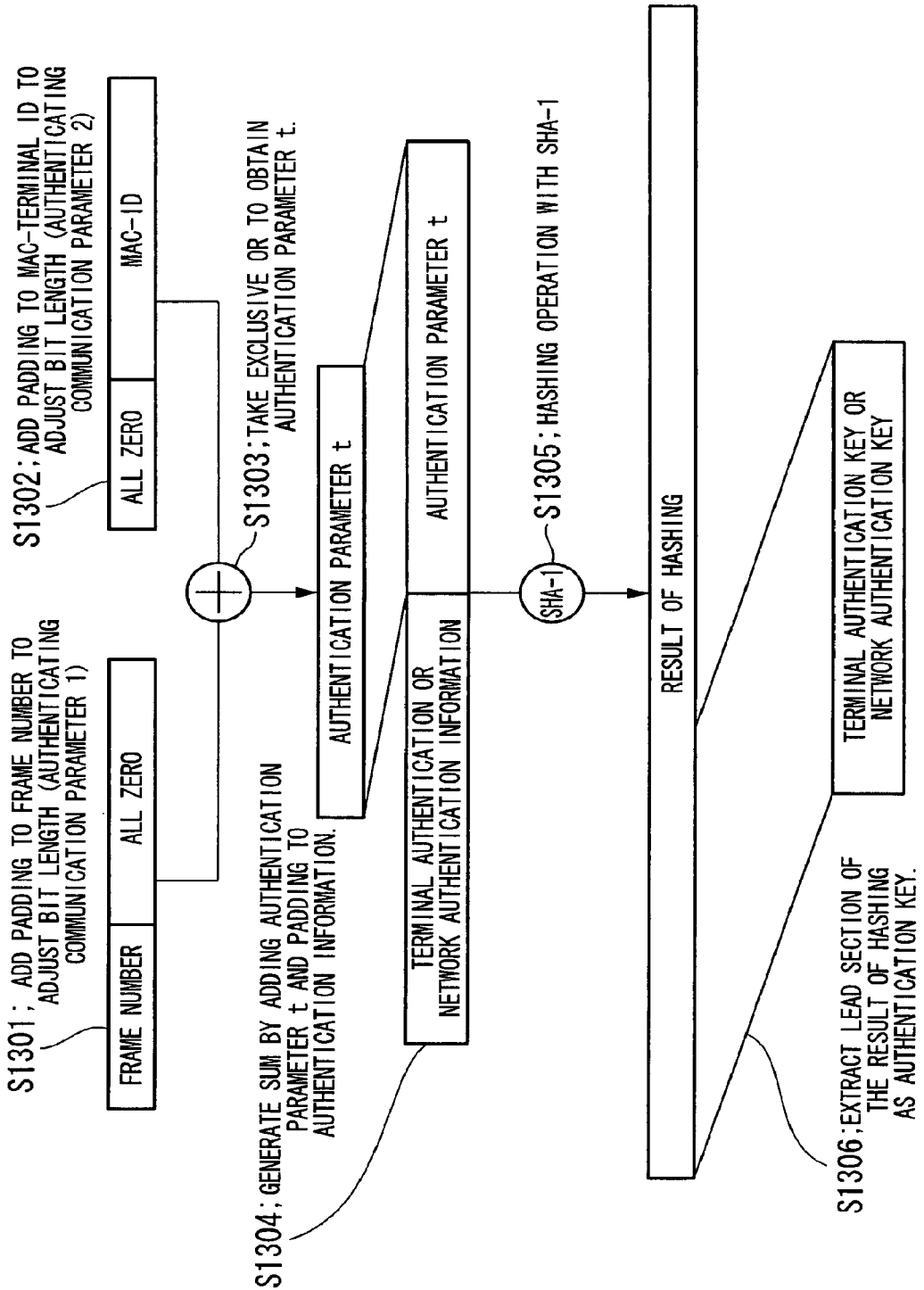
FIG. 15 is an explanatory diagram for explaining the method for generating an authentication key in the second embodiment.

Next, the method for generating the authentication key in the wireless terminal 1101 which makes request for authentication in this embodiment will now be described more specifically with reference to FIG. 15.

First, the authentication parameter acquiring section 1210 acquires a frame number as the authenticating communication parameter 1 and a wireless terminal identifier (MAC-terminal ID) as the authenticating communication parameter 2.

Next, the authentication parameter generating section 1211 adds padding at the end of the bit string of the authenticating communication parameter 1 acquired by the authentication parameter acquiring section 1210 so as to adjust the bit length (step S1301). Subsequently, the authentication parameter generating section 1211 adds padding at the head of the bit string of the authenticating communication parameter 2 acquired by the authentication parameter acquiring section 1210 (step S1302). Thus, the bit length is adjusted. In an exemplary method for adding the padding, a value constituted solely from zero bits is added. As an example of the method for adjusting the bit length, the bit length may be adjusted by extracting some bits when the bit length is too long, or adding padding at an arbitrary position when the bit length is too short.

Then the authentication parameter generating section 1211 takes exclusive OR of the authenticating communication parameters 1 and 2 with the padding added thereto, thereby generating the authentication parameter t (step S1303).

Next, the authentication key generating section 1213 concatenates the authentication information acquired by the authentication information acquiring section 1212 and the authentication parameter t generated by the authentication parameter generating section 1211 (step S1304), adds padding at an arbitrary position as required, and carries out a hashing calculation with SHA-1 (step S1305).

Subsequently, the authentication key generating section 1203 generates an authentication key by extracting a part or whole of the result of the hashing (step S1306).

It should be noted that the above description assumed that the wireless terminal 1101 requests authentication and the authentication administration server 1103 carries out authentication. However, both the wireless terminal 1101 and the authentication administration server 1103 can request authentication or carry out authentication. Therefore, the wireless terminal 1101 has the functions of requesting authentication illustrated in FIG. 13 and the functions of carrying out authentication illustrated in FIG. 14. Moreover, the authentication administration server 1103 has the functions of requesting authentication illustrated in FIG. 13 and the functions of carrying out authentication illustrated in FIG. 14.

Moreover, while the method for generating the authentication key by the wireless terminal 1101 according to this embodiment has been described with reference to FIG. 15, the method that the authentication administration server 1103 generates the authentication key is similar to the method for generating the authentication key by the wireless terminal 1101.

Figure 14:
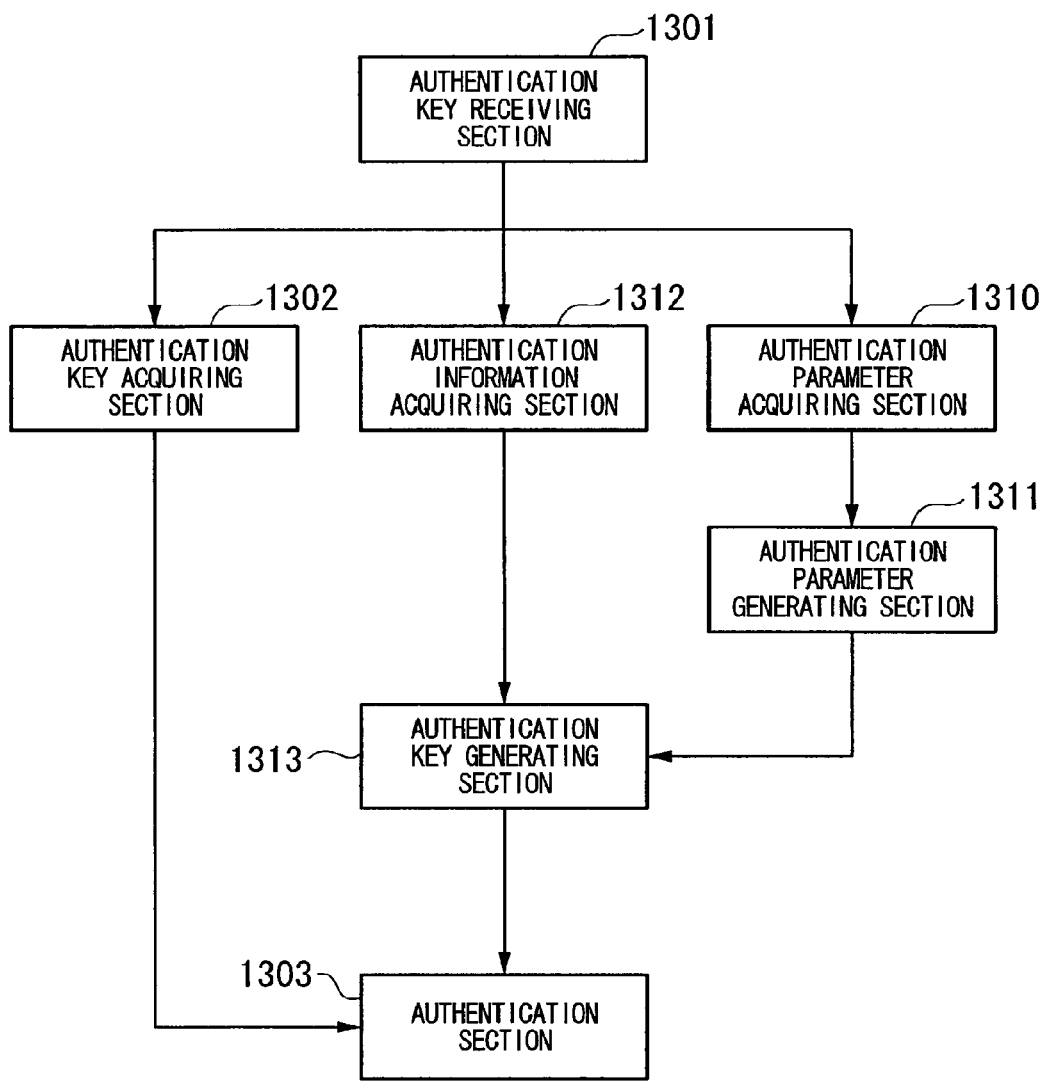
FIG. 14 is a functional block diagram showing the constitution of the authentication administration server 1103 which makes authentication in the second embodiment.

That is, in the foregoing description with respect to the functions of requesting authentication and the functions of carrying out authentication, the authentication parameter generating section 1211 shown in FIG. 13 and the authentication parameter generating section 1311 shown in FIG. 14 have the same functions, the authentication key generating section 1213 shown in FIG. 13 and the authentication key generating section 1313 shown in FIG. 14 have the same functions, and the same method for generating the authentication key based on the authentication parameter t and the authentication information is employed.

However, the methods for acquiring the authenticating communication parameter and the authentication information are different between the authentication parameter acquiring section 1210 and the authentication parameter acquiring section 1310 and also between the authentication information acquiring section 1212 and the authentication information acquiring section 1312. Specifically, while the authentication parameter acquiring section 1210 selects and acquires the authenticating communication parameters from among the communication parameters of the communication between the wireless terminal 1101 and the wireless base station 1102, the authentication parameter acquiring section 1310 extracts the authenticating communication parameters from the terminal authentication request information received by the authentication key receiving section 1301. Moreover, while the authentication information acquiring section 1212 acquires authentication information held by the wireless terminal 1101, the authentication information acquiring section 1312 acquires the relevant authentication information of the wireless terminal 1101 from the authentication administration database 1104 based on the terminal ID received by the authentication key receiving section 1301.

Figure 16:
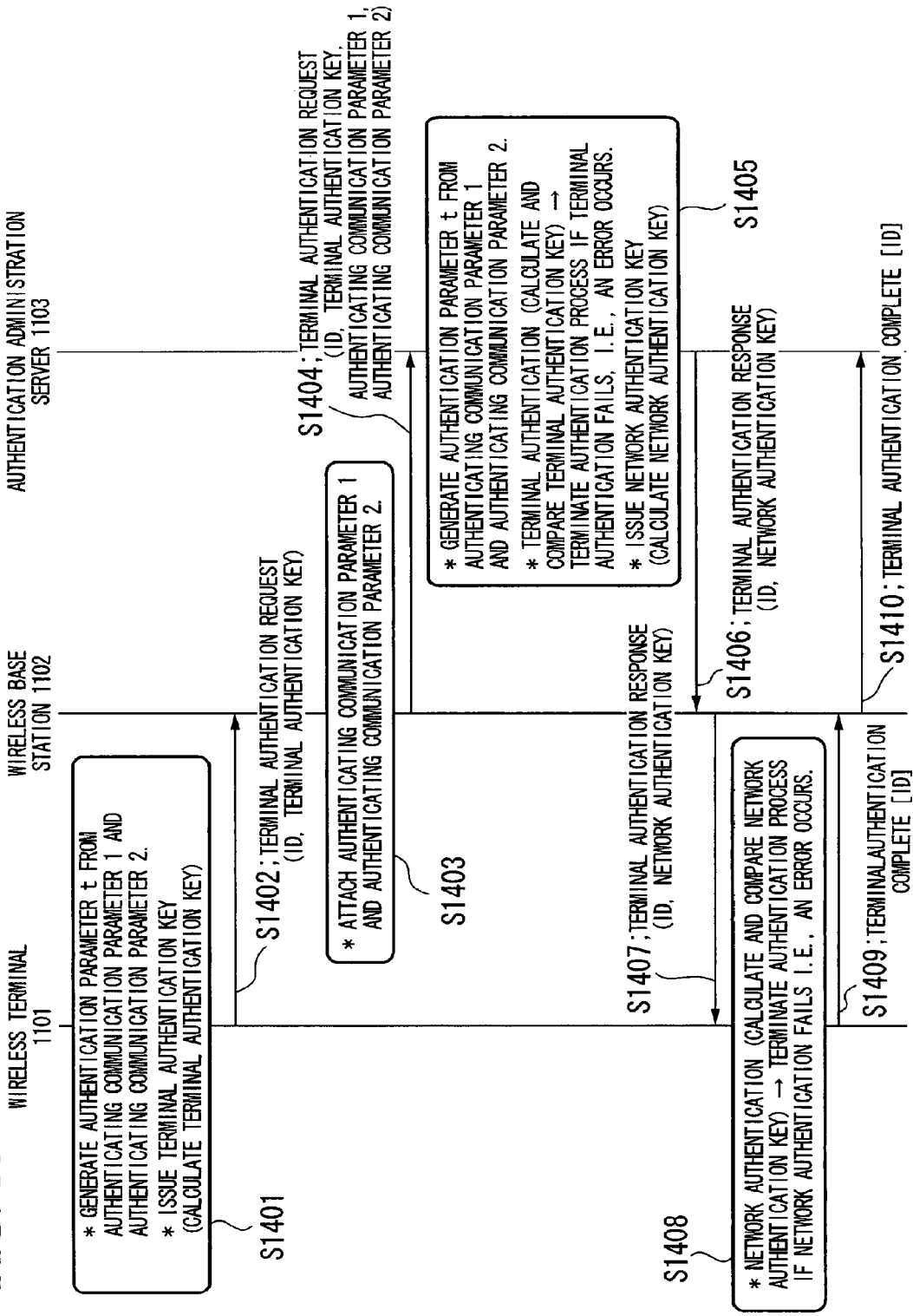
FIG. 16 is a sequence diagram explanatory of entire operations in authentication in case the wireless terminal requests the authentication administration server to start authentication in the second embodiment.

Next, the processing flow of the entire authentication system of this embodiment will now be described with reference to the sequence diagram shown in FIG. 16.

First, the wireless terminal 1101 starts wireless communication with the wireless base station 1102. Then the wireless terminal 1101 acquires the authenticating communication parameters 1 and 2 from among the information (communication parameters) for connection of wireless communication between the wireless terminal 1101 and the wireless base station 1102, and generates the authentication parameter t through a calculation such as exclusive OR. Then the wireless terminal 1101 generates the terminal authentication key f1($n, t$) by a calculation using the hash function based on the authentication parameter t and the terminal authentication information f0($n$) (step S1401). Next, the wireless terminal 1101 sends the terminal ID which is the identifier of itself and the terminal authentication key f1($n, t$) to the wireless base station 1102 as the terminal authentication request message (step S1402).

Then, the wireless base station 1102 acquires the authenticating communication parameters 1 and 2 from among the information for wireless connection between the wireless terminal 1101 and the wireless base station 1102, attaches the authenticating communication parameters to the terminal authentication request message from the wireless terminal 1101 (step S1403), and sends them to the authentication administration server 1103 (step S1404).

Next, the authentication administration server 1103 uses the terminal ID included in the terminal authentication request message which has been received to acquire terminal authentication information f0($n$) and network authentication information g0($n$) unique to the wireless terminal 1101 from the authentication administration database 1104. Then the authentication administration server 1103 generates the authentication parameter t through a calculation such as exclusive OR based on the authenticating communication parameters 1 and 2 included in the terminal authentication request message which has been received. Then the authentication administration server 1103 generates the terminal authentication key f2($n, t$) by a calculation using the hash function F based on the authentication parameter t which has been generated and the terminal authentication information f0($n$) which has been acquired. The authentication administration server 1103 judges whether the terminal authentication key f1($n, t$) which has been received is identical to the terminal authentication key f2($n, t$) which is generated from the terminal authentication information f0($n$) and the authentication parameter t held by the authentication administration server 1103, and if the judgment result indicates that both keys are identical, the authentication administration server 1103 authenticates the wireless terminal 1101 as a legitimate wireless terminal with which the authentication administration server 1103 shares the same terminal authentication information f0($n$).

In case the authentication administration server 1103 has judged that the terminal authentication key f1($n, t$) which has been received and the terminal authentication key f2($n, t$) which has been generated are not identical, the wireless terminal 1101 is not a legitimate wireless terminal and the authentication is a failure. When the authentication fails, the authentication administration server 1103 does not proceed along the authentication procedure and, for example, sends an error message to the wireless terminal 1101 as required. When the authentication has failed, the wireless terminal 1101 cannot start communication with the network 1105.

Next, if the authentication administration server 1103 authenticates the wireless terminal 1101 as a legitimate wireless terminal, the authentication administration server 1103 generates the network authentication information g2($n, t$) by a calculation using the hash function G based on the authentication parameter t used when generating the terminal authentication key f2($n, t$) and the network authentication information g0($n$) which has been acquired (step S1405). The authentication administration server 1103 sends the network authentication key g2($n, t$) and the terminal ID which is an identifier of the wireless terminal 1101 as the terminal authentication response message to the wireless base station 1102 (step S1406).

Then the wireless base station 1102 sends the terminal authentication response message received from the authentication administration server 1103 to the wireless terminal 1101 (step S1407).

Next, the wireless terminal 1101 generates the network authentication key g1(n, t) by a calculation using the hash function G based on the network authentication information g0(n) related to the authentication administration server 1103 which has been held in advance by the wireless terminal 1101 and the authentication parameter t used when generating the terminal authentication key f1(n, t). Then the wireless terminal 1101 judges whether the network authentication key g2(n, t) which has been received and the network authentication key g1(n, t) which has been generated are identical. When the judgment result indicates that both keys are identical, the wireless terminal 1101 authenticates the authentication administration server 1103 as a legitimate authentication administration server with which the wireless terminal 1101 shares the same network authentication information g0(n).

In case the network authentication key g2(n, t) which has been received and the network authentication key g1(n, t) which has been generated are not identical, the wireless terminal 1101 judges that "the authentication administration server 1103 is not a legitimate authentication administration server", and the authentication is a failure. When the authentication fails, the wireless terminal 1101 does not proceed along the authentication and, for example, sends an error message to the authentication administration server 1103 as required. When the authentication has failed, the wireless terminal 1101 cannot start communication with the network 1105 (step S1408).

Next, in case the wireless terminal 1101 has authenticated the authentication administration server 1103 as a legitimate authentication administration server, the wireless terminal 1101 sends a terminal authentication complete message including the terminal ID, which is its own identifier, to the wireless base station 1102, in order to notify the authentication administration server 1103 that mutual authentication has been completed (step S1409).

Then the wireless base station 1102 sends the terminal authentication complete message from the wireless terminal 1101 to the authentication administration server 1103 (step S1410).

Next, upon receipt of the terminal authentication complete message, the authentication administration server 1103 knows that mutual authentication between the wireless terminal 1101 and the authentication administration server 1103 is complete. As the mutual authentication has been completed, the wireless terminal 1101 can communicate with the network 1105 via the authentication administration server 1103.

As described above, mutual authentication between the wireless terminal 1101 and the authentication administration server 1103 can be completed by exchanging three messages between the wireless terminal 1101 and the authentication administration server 1103 in steps S1402 and S1404, steps S1406-1407, and steps S1409-1410.

In the example described above, the wireless terminal 1101 requests the authentication administration server 1103 to start the authentication. In case the authentication administration server 1103 requests the wireless terminal 1101 to start the authentication, the order of authentication processes is reversed. That is, upon receipt of a request by the authentication administration server 1103, the wireless terminal 1101 first compares network authentication keys g(n, t) and, upon receipt of a response to the request, the authentication administration server 1103 compares terminal authentication keys f(n, t), to complete the mutual authentication.

Figure 17:
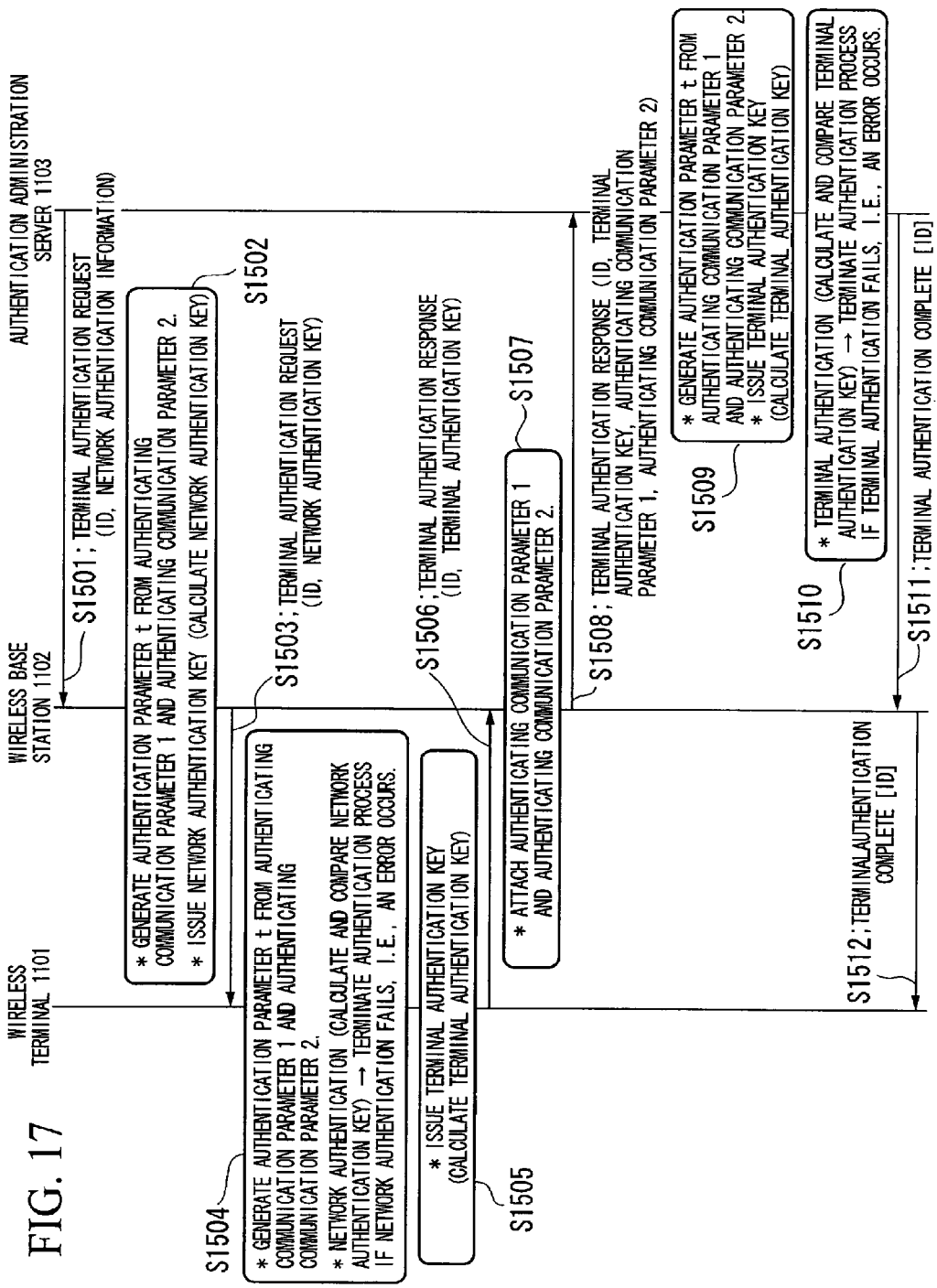
FIG. 17 is a sequence diagram explanatory of the entire operations in authentication in case the authentication administration server requests the wireless terminal to start authentication in the second embodiment.

The processing flow of the entire authentication system in this case will now be described with reference to the sequence diagram shown in FIG. 17. For example, when another terminal connected to the network 1105 wants to send data to the wireless terminal 1101 as the destination of sending, the other terminal sends the data with the terminal ID of the wireless terminal 1101 attached thereto, to the authentication administration server 1103. The authentication administration server 1103 uses the terminal ID which has been received to acquire the terminal authentication information f0(n) and network authentication information g0(n) which are unique to the wireless terminal 1101 from the authentication administration database 1104.

Then the authentication administration server 1103 attaches the terminal ID and the network authentication information g0(n), which have been received, to a terminal authentication request message, and sends them to the wireless base station 1102 (step S1501). Here, since the authenticating communication parameters 1 and 2 are known only to the wireless terminal 1101 and the wireless base station 1102, the network authentication key is generated by the wireless base station 1102, not by the authentication administration server 1103. Accordingly, the authentication administration server 1103 notifies the network authentication information g0(n) to the wireless base station 1102.

The wireless base station 1102 acquires the authenticating communication parameters 1 and 2 from among the communication parameters between the wireless terminal 1101 and the wireless base station 1102, and generates the authentication parameter t through a calculation such as exclusive OR. Then the wireless base station 1102 generates the network authentication key g2(n, t) by a calculation using the hash function G based on the authentication parameter t which has been generated and the network authentication information g0(n) which is attached to the received terminal authentication request message (step S1502). Then the wireless base station 1102 attaches the network authentication key g2(n, t) and the terminal ID to the terminal authentication request message, and sends them to the wireless terminal 1101 (step S1503).

The wireless terminal 1101 acquires the authenticating communication parameters 1 and 2 from among the communication parameters between the wireless terminal 1101 and the wireless base station 1102, and generates the authentication parameter t through a calculation such as exclusive OR. Then the wireless terminal 1101 generates the network authentication key g1(n, t) by a calculation using the hash function G based on the authentication parameter t and the network authentication information g0(n) related to the authentication administration server 1103 that is held in advance by the wireless terminal 1101 itself. Then the wireless terminal 1101 judges whether the network authentication key g2(n, t) which has been received and the network authentication key g1(n, t) which has been generated are identical. When the judgment result indicates that both keys are identical, the wireless terminal 1101 authenticates the authentication administration server 1103 as a legitimate authentication administration server with which the wireless terminal 1101 shares the same network authentication information g0(n) (step S1504).

On the other hand, in case the judgment result indicates that the network authentication key g2(n, t) which has been received is not identical to the network authentication key g1(n, t) which has been generated, the wireless terminal 1101 judges that "the authentication administration server 1103 is not a legitimate authentication administration server", and the authentication is a failure. When the authentication fails, the wireless terminal 1101 does not proceed along the authentication procedure, and, for example, sends an error message to the authentication administration server 1103 as required. When the authentication has failed, the wireless terminal 1101 cannot start communication with the network 1105.

Next, in case the wireless terminal 1101 has authenticated the authentication administration server 1103 as a legitimate authentication administration server, the wireless terminal 1101 generates the terminal authentication key f1($n, t$) by a calculation using the hash function F based on the authentication parameter t used when generating the network authentication key g1($n, t$) and the terminal authentication information f0($n$) held by the wireless terminal 1101 itself (step S1505). Then the wireless terminal 1101 attaches its own terminal ID and the terminal authentication key f1($n, t$) to a terminal authentication response message, and sends them to the wireless base station 1102 (step S1506).

The wireless base station 1102 attaches the authenticating communication parameters 1 and 2 which have been acquired previously (step S1502) to the terminal authentication response message from the wireless terminal 1101 (step S1507), and sends them to the authentication administration server 1103 (step S1508).

The authentication administration server 1103 generates the authentication parameter t through a calculation such as exclusive OR based on the authenticating communication parameters 1 and 2 attached to the terminal authentication response message which has been received. Then the authentication administration server 1103 generates the terminal authentication key f2($n, t$) by a calculation using the hash function F based on the authentication parameter t thus generated and the terminal authentication information f0($n$) which has been acquired previously (step S1509).

Then the authentication administration server 1103 judges whether the terminal authentication key f1($n, t$) which has been received is identical to the terminal authentication key f2($n, t$) which has been generated, and if the judgment result indicates that both keys are identical, the authentication administration server 1103 authenticates the wireless terminal 1101 as a legitimate wireless terminal with which the authentication administration server 1103 shares the same terminal authentication information f0($n$). On the other hand, in case the terminal authentication key f1($n, t$) which has been received is not identical to the terminal authentication key f2($n, t$) which has been generated, the wireless terminal 1101 is not a legitimate wireless terminal, and the authentication is a failure. When the authentication fails, the authentication administration server 1103 does not proceed along the authentication procedure and, for example, sends an error message to the wireless terminal 1101 as required. When the authentication has failed, the wireless terminal 1101 cannot start communication with the network 1105 (step S1510).

On the other hand, if the wireless terminal 1101 is authenticated as a legitimate wireless terminal, the authentication administration server 1103 sends a terminal authentication complete message, with the terminal ID attached thereto, to the wireless base station 1102, in order to notify the wireless terminal 1101 that mutual authentication is complete (step S1511). The wireless base station 1102 sends the terminal authentication complete message from the authentication administration server 1103 to the wireless terminal 1101 (step S1512).

Upon receipt of the terminal authentication complete message, the wireless terminal 1101 knows that mutual authentication between the wireless terminal 1101 and the authentication administration server 1103 is complete. As the mutual authentication has been completed, the wireless terminal 1101 is enabled to communicate with the network 1105 via the authentication administration server 1103.

As described above, mutual authentication between the wireless terminal 1101 and the authentication administration server 1103 can be completed by exchanging three messages between the wireless terminal 1101 and the authentication administration server 1103 in steps S1501 and S1503, steps S1506 and S1508, and steps S1511-1512.

As will be understood from the forgoing description, in the terminal authentication in which the authentication administration server authenticates the wireless terminal, the wireless terminal selects and acquires, as the authenticating communication parameters, predetermined communication parameters from among the communication parameters which are shared by the wireless base station and change with time and the position of the wireless terminal (such as a wireless terminal identifier (MAC-terminal ID), a frame number, a slot number, clock information), generates the terminal authentication key from the authenticating communication parameters thus selected and acquired, and sends the terminal authentication key. The wireless base station, when it relays the terminal authentication key to the authentication administration server, attaches the authenticating communication parameters which are the communication parameters which have been selected and acquired, and sends them to the authentication administration server. The authentication administration server calculates the terminal authentication key independently based on the received authenticating communication parameters, and, when it is identical to the terminal authentication key received from the wireless terminal, authenticates the wireless terminal.

Moreover, network authentication, in which the wireless terminal authenticates the authentication administration server, is achieved in a method similar to that of the terminal authentication by the authentication administration server sending the network authentication key to the wireless terminal and completed by the wireless terminal sending notification of completion to the authentication administration server. Thus mutual authentication between the wireless terminal and the authentication administration server can be realized by three messages.

The communication parameters, which are sent from the wireless base station or shared between the wireless base station and the wireless terminal at the start of communication, change with time and with the movement of the terminal, and the same values thereof can be held in common by the wireless base station and the wireless terminal, and therefore can be used instead of values which change at every communication session in the challenge & response.

Moreover, because the communication parameters, which are sent from the wireless base station or shared between the wireless base station and the wireless terminal at the start of communication, are essential for and existing prior to the establishment of the communication channel between the wireless terminal and the wireless base station, the communication parameters can be used as the authenticating communication parameter without requiring any newly arising cost.

The authentication method of this embodiment described above makes it possible to achieve mutual authentication even a large number of terminals each communicating small amount of data and using a limited bandwidth, such as sensors or other small and low-cost mobile wireless terminals, are to be authenticated.

Moreover, the authentication method of this embodiment does not require functions of complicated computation such as public key encryption scheme, generation of random number, or clock, and therefore can be employed even in a case where small and low-cost wireless terminals are involved.

Furthermore, since the authentication method of this embodiment involves a small amount of computation and small amount of wireless communications, the wireless terminal can be operated over a long period of time by a battery thereof.

In addition, since the authentication method of this embodiment involves a few steps of wireless communication and small amount of wireless communications, the wireless bandwidth can be efficiently utilized and authentication of a large number of terminals can be done at the same time.

It should be noted that this embodiment can be used, not only in mutual authentication between terminals and an authentication administration server, but also used only in the authentication of terminals by the authentication administration server or used only in the authentication of network by the terminal.

For example, authentication of terminals only can be done by the wireless terminal 1101 shown in FIG. 11 sending the terminal authentication key f(n, t) to the authentication administration server 1103 and the authentication administration server 1103 authenticating the terminal authentication key f(n, t), thereby completing the authentication of the wireless terminal 1101 by the authentication administration server 1103.

Conversely, authentication of the network only can be done by the authentication administration server 1103 sending the network authentication key g(n, t) to the wireless terminal 1101 and the wireless terminal 1101 authenticating the network authentication key g(n, t), thereby completing the authentication of the authentication administration server 1103 by the wireless terminal 1101.

It should be noted that in the description of this embodiment, the authentication parameter t is generated by selecting the frame number of the authenticating communication parameter 1 and the wireless terminal identifier (MAC-terminal ID) of the authenticating communication parameter 2, as the authenticating communication parameters, from among the communication parameters. However, the method for generating the authentication parameter t in this embodiment is not limited to this. The authentication parameter t may also be generated from the authenticating communication parameters which are selected from among communication parameters which includes: a terminal identifier (MAC-terminal ID); a frame number; a slot number; clock information; an identifier of the wireless base station; an identifier of a paging area; the number of terminal groups serviced by the wireless base station; the number of communication carriers provided by the wireless base station; an index indication the communication congested condition notified by the wireless base station; a terminal group number to which the terminal belongs; the number of a communication carrier with which the terminal is in communication; and a random number, or a combination of some of these.

While embodiments of the present invention have been described in detail with reference to the accompanying drawings, specific constitutions are not limited to these embodiments, and various designs may be made without departing from the gist of the present invention. For example, the first embodiment and the second embodiment can be combined in an appropriate manner. Hereinafter, an example of such a combination will now be described as a third embodiment.

Third Embodiment

Figure 18:
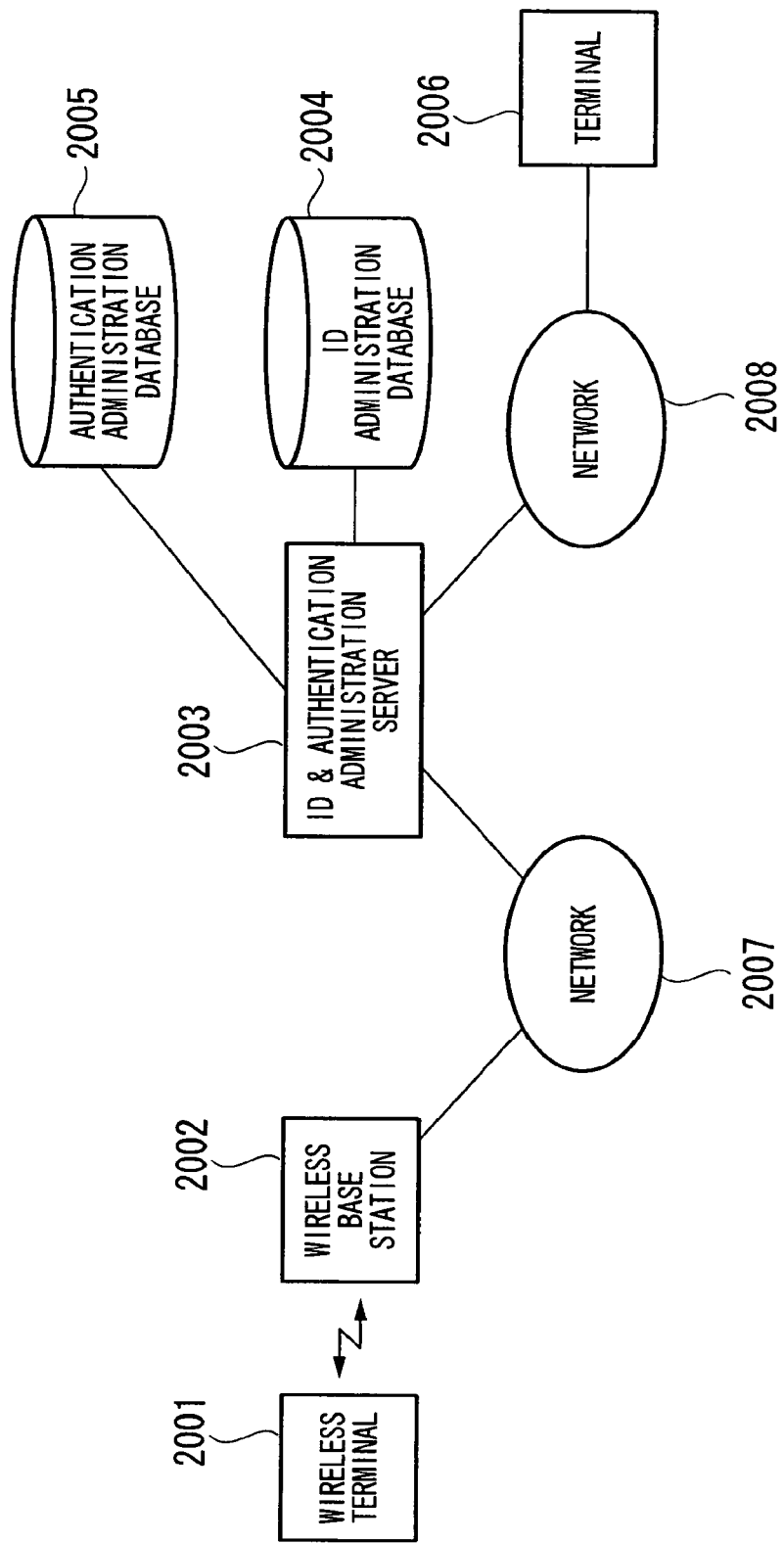
FIG. 18 is a block diagram showing the constitution of a system according to a third embodiment of the present invention.

FIG. 18 is a block diagram showing the constitution of a system according to this embodiment. A wireless terminal 2001 has the function of the wireless terminal 101 of the first embodiment and the function of the wireless terminal 1101 of the second embodiment. A wireless base station 2002 has the function of the wireless base station 105 of the first embodiment and the function of the wireless base station 1102 of the second embodiment. An ID & authentication administration server 2003 has the function of the ID administration server 103 of the first embodiment and the function of the authentication administration server 1103 of the second embodiment. An ID administration database 2004, an authentication administration database 2005, and a terminal 2006 have functions similar to those of the ID administration database 104 of the first embodiment, the authentication administration database 1104 of the second embodiment, and the terminal 102 of the first embodiment, respectively. Moreover, networks 2007 and 2008 are similar to the networks 106 and 107 of the first embodiment and the network 1105 of the second embodiment.

FIG. 19 is a sequence diagram showing the processing flow of the entire system in case the wireless terminal 2001 requests the ID & authentication administration server 2003 to start authentication. Since individual operations are basically similar to those of the first embodiment and the second embodiment, description will be focused on the overall processing flow limiting only on key points and omitting the details.

First, the wireless terminal 2001 generates a terminal authentication key (step S2001), attaches the temporary ID of itself and the terminal authentication key to a terminal authentication request message, and sends them to the wireless base station 2002 (step S2002). The wireless base station 2002 is able to recognize the MAC-terminal ID assigned to a slot position (hence the wireless terminal 2001 to which this MAC-terminal ID is assigned) in accordance to the slot position through which the terminal authentication request message was sent. The wireless base station 2002 stores the temporary ID and the MAC-terminal ID, acquires authenticating communication parameters 1 and 2, adds them to the terminal authentication request message received from the wireless terminal 2001, and sends them to the ID & authentication administration server 2003 (step S2003). The ID & authentication administration server 2003 adds the temporary ID attached to the received terminal authentication request message to a terminal ID search request message (which corresponds to the permanent ID search request shown in FIG. 5), and sends them to the ID administration DB 2004 (step S2004). The ID administration DB 2004 searches for the permanent ID so as to acquire a permanent ID from the temporary ID, adds the acquired permanent ID to a terminal ID search response message (which corresponds to the permanent ID search response shown in FIG. 5), and sends them to the ID & authentication administration server 2003 (step S2005).

The ID & authentication administration server 2003 attaches the permanent ID, which has been sent, to an authentication information request message and sends them to the authentication administration database 2005 (step S2006). The authentication administration database 2005 acquires terminal authentication information and NW authentication information, and attaches these pieces of information to an authentication information search response message, and sends them to the ID & authentication administration server 2003 (step S2007). The ID & authentication administration server 2003 sends a NEXT temporary ID search request message (which corresponds to the search request shown in FIG. 4) with the permanent ID attached thereto to the ID administration DB 2004 (step S2008). The ID administration DB 2004 generates a NEXT temporary ID, which is a temporary ID which does not conflict with temporary IDs of other terminals, attaches the number of hashing operations of the NEXT temporary ID to a NEXT temporary ID search response message (corresponding to steps S507 to S509, etc., in FIG. 5), and sends them to the ID & authentication administration server 2003 (step S2009).

The ID & authentication administration server 2003 generates a terminal authentication key from the authenticating communication parameters 1 and 2 which it holds and the terminal authentication information attached to the authentication information search response message (step S2010), and compares the terminal authentication key thus generated with the terminal authentication key attached to the terminal authentication request message (step S2011). Next, the ID & authentication administration server 2003 generates a NW authentication key from the authenticating communication parameters 1 and 2, and the NW authentication information (step S2012), and sends a terminal authentication response message, with the temporary ID, the permanent ID, the NW authentication key, and the number of hashing operations of temporary ID attached thereto, to the wireless base station 2002 (step S2013).

The wireless base station 2002 is able to recognize the correspondence between the permanent ID and the MAC-terminal ID based on the temporary ID and the permanent ID attached to the terminal authentication response message, and the temporary ID and the MAC-terminal ID which were stored when the terminal authentication request message was received from the wireless terminal 2001. When the wireless base station 2002 receives a message (e.g. a terminal authentication complete message) thereafter, the wireless base station 2002 can convert the MAC-terminal ID into the permanent ID based on the correspondence between the permanent ID and the MAC-terminal ID. In such a case as the wireless base station, to which the wireless terminal 2001 belongs, changes as the wireless terminal 2001 moves, a MAC-terminal ID release message is sent so as to release the MAC-terminal ID. Until then, the wireless terminal 2001 can be identified with the MAC-terminal ID in the wireless section, while the wireless terminal 2001 can be identified with the permanent ID in the wired section, and therefore messages can be exchanged without need for converting between the temporary ID and the permanent ID in the network.

Then, the wireless base station 2002 sends a terminal authentication response message with the NW authentication key and the number of hashing operations of temporary ID attached thereto to the wireless terminal 2001 (S2014). The wireless terminal 2001 generates a NW authentication key using the authenticating communication parameters 1 and 2 which it holds and the network authentication information (step S2015), and compares the NW authentication key thus generated with the NW authentication key attached to the terminal authentication response message (step S2016). In case the NW is successfully authenticated by this comparison, the wireless terminal 2001 sends a terminal authentication complete message via the wireless base station 2002 to the ID & authentication administration server 2003 (steps S2017, S2018). Moreover, the wireless terminal 2001 updates the temporary ID by using the number of hashing operations of temporary ID attached to terminal authentication response message (step S2019).

Next, FIG. 20 is a sequence diagram showing the processing flow of the entire system in case the ID & authentication administration server 2003 requests the wireless terminal 2001 to start authentication.

First, the ID & authentication administration server 2003 responds to a data transmit request from a terminal or the like (not shown) which has specified the wireless terminal 2001 as the destination of sending, and sends a temporary ID search request message (which corresponds to the temporary ID search shown in FIG. 7) having the permanent ID of the wireless terminal 2001 which is attached to the data transmit request, to the ID administration DB 2004 (step S2101). The ID administration DB 2004 searches for the temporary ID corresponding to the permanent ID which has been received, and sends a temporary ID search response message (which corresponds to the temporary ID search response shown in FIG. 7) with the temporary ID which has been obtained attached thereto, to the ID & authentication administration server 2003 (step S2102).

The ID & authentication administration server 2003 attaches the permanent ID, which has been sent, to an authentication information request message, and sends them to the authentication administration database 2005 (step S2103). The authentication administration database 2005 acquires terminal authentication information and NW authentication information corresponding to the permanent ID, attaches these pieces of information to an authentication information search response message, and sends them to the ID & authentication administration server 2003 (step S2104). The ID & authentication administration server 2003 sends a NEXT temporary ID search request message, with the permanent ID attached thereto, to the ID administration DB 2004 (step S2105). The ID administration DB 2004 generates a NEXT temporary ID which does not conflict with temporary IDs of other terminals, attaches the number of hashing operations corresponding therewith as the number of hashing operations of temporary ID to a NEXT temporary ID search response message, and sends them to the ID & authentication administration server 2003 (step S2106). The ID & authentication administration server 2003 sends a terminal authentication request message, with the temporary ID, the permanent ID, NW authentication information, and the number of hashing operations of temporary ID attached thereto, to the wireless base station 2002 (step S2107).

The wireless base station 2002 generates a NW authentication key using the authenticating communication parameters 1 and 2 which it holds and the network authentication information which has been received (step S2108), and sends a terminal authentication request message, with the NW authentication key thus generated, the temporary ID, and the number of hashing operations of temporary ID attached thereto, to the wireless terminal 2001 (step S2109). It should be noted that in this case, since it is unknown as to the wireless terminal of which MAC-terminal ID should be addressed by the wireless base station 2002 when it sends the terminal authentication request message, the wireless base station 2002 sends the terminal authentication request message to all the wireless terminals via the broadcasting control channel. Moreover, since the MAC-terminal ID or the random number used in a MAC-terminal ID assignment process cannot be used as the authenticating communication parameters, communication parameters other than these are used. However, in case the terminal authentication request message is sent to the wireless terminal after the wireless base station calls up the wireless terminal with a call message sent over the broadcasting control channel and assigns the MAC-terminal ID, the MAC-terminal ID or the random number used in MAC-terminal ID assignment can be used.

Upon receipt of the terminal authentication request message from the wireless base station 2002, the wireless terminal 2001 generates a NW authentication key from the authenticating communication parameters 1 and 2, and the NW authentication information which it holds (step S2110), and compares the NW authentication key thus generated with the NW authentication key attached to the terminal authentication request message (step S2111). Then, the wireless terminal 2001 generates a terminal authentication key using the authenticating communication parameters 1 and 2 described above and terminal authentication information which it holds (step S2112), attaches the temporary ID of itself and the terminal authentication key thus generated to a terminal authentication response message, and sends them to the wireless base station 2002 (step S2113). The wireless base station 2002 converts the temporary ID attached to the terminal authentication response message into a permanent ID, attaches the permanent ID, the terminal authentication key, and the authenticating communication parameters 1 and 2 which it holds to a terminal authentication response message, and sends them to the ID & authentication administration server 2003 (step S2114).

The ID & authentication administration server 2003 generates a terminal authentication key using the authenticating communication parameters 1 and 2 which have been received and the terminal authentication information previously acquired (step S2115), and compares the terminal authentication key thus generated with the terminal authentication key attached to the terminal authentication response message which has been received (step S2116). If the terminal is successfully authenticated by this comparison, the ID & authentication administration server 2003 sends a terminal authentication complete message via the wireless base station 2002 to the wireless terminal 2001 (steps S2117, S2118). Upon receipt of the terminal authentication complete message, the wireless terminal 2001 updates the temporary ID using the number of hashing operations of temporary ID attached to the terminal authentication request message (step S2119).

Next, FIG. 21 is a sequence diagram showing the processing flow of the entire system in the temporary ID initialization process. The flow of the entire system is basically the same as that shown in FIG. 19 except for the following points: the NEXT temporary ID search request message for initialization having the permanent ID attached is sent from the ID & authentication administration server 2003 to the ID administration DB 2004 (step S2008a in FIG. 21) instead of the NEXT temporary ID search request message in step S2008 of FIG. 19; the NEXT temporary ID search response message for initialization having the number of hashing operations of temporary ID and the initial temporary ID vector attached is sent from the ID administration DB 2004 to the ID & authentication administration server 2003 (step S2009a in FIG. 21) instead of the NEXT temporary ID search response message in step S2009 of FIG. 19; the initial temporary ID vector is attached further to the terminal authentication response message sent from the ID & authentication administration server 2003 to the wireless base station 2002 (step S2013a in FIG. 21); initial temporary ID vector IV is attached further to the terminal authentication response message which is sent from the wireless base station 2002 to the wireless terminal 2001 (step S2014a in FIG. 21); and the process related to the initialization of temporary ID described with reference to FIG. 8 and FIG. 9 is carried out (e.g., the facts that: the wireless terminal 2001 specifies the temporary ID dedicated to the temporary ID initialization process; the ID & authentication administration server 2003 generates the initial temporary ID vector and calculates an initialized hash seed, a temporary ID, and the number of hashing operations of temporary ID; and the number of hashing operations of temporary ID and the initial temporary ID vector are sent from the ID & authentication administration server 2003 to the wireless terminal 2001 so as to carry out the initialization process at the wireless terminal 2001, too).

It should be noted that in any of the embodiments described above, the wireless terminal, the wireless base station, the ID administration server, the authentication administration server, and the ID & authentication administration server may also be constituted so as to incorporate a computer system therein. In this case, operating steps of the respective sections of the wireless terminal, the wireless base station, the ID administration server, the authentication administration server, and the ID & authentication administration server are described in programs which are stored in a computer-readable recording medium, so that the computer system reads out and executes the programs thereby achieving the respective processes described above.

The computer system mentioned here includes a CPU (central process unit), various memories, hardware such as peripheral devices, and an OS (operating system). Moreover, in case a WWW (world wide web) system is used, the computer system also includes environment for providing or displaying home page.

Moreover, the "computer-readable recording medium" may be a non-volatile memory which allows writing over such as a flexible disk, a magneto-optical disk, a ROM, or a flash memory, a portable medium such as a CD (compact disk)-ROM, and hard disk or the like incorporated in the computer system. In addition, the "computer-readable recording medium" also includes those which hold programs for a certain period of time such as a volatile memory (e.g., DRAM (dynamic random access memory)) provided in a computer system which is used as a server or a client in case the programs are sent via a network such as Internet or a communication line such as a telephone line.

Furthermore, the programs described above may also be sent from a computer system which stores the program in a memory device, etc., thereof to another computer system via a transmission medium or a transmission wave in the transmission medium. The "transmission medium" refers to a medium over which information is transmitted, such as a network including Internet, or a communication line including a telephone line. The program described above may be one which achieves a part of the functions described above, or one that achieves the functions by combination with a program which has already been stored in the computer system, i.e., the so-called differential program.

INDUSTRIAL APPLICABILITY

The present invention is preferably applied to wireless terminals which are required to protect privacy. The present invention is also preferably applied to an authentication method between wireless terminals and a server.

The invention claimed is:
1. A terminal identification method for identifying at least terminal in communication via a network between a server and the terminal, the method comprising:

sharing a first hash function H and an initial value S(k, 0) which is determined for each terminal between the server and the terminal;

calculating a temporary ID at the server and the terminal based on a value S(k, i) which is obtained by hashing the initial value S(k, 0) i times with the first hash function H, or by performing a calculation using the initial value S(k, 0), a parameter i, and the first hash function H; and calculating the same temporary ID at the server and the terminal by setting the same number of times of hashing operations at the server and the terminal to identify the terminal using the temporary ID, (A) wherein the temporary ID is calculated at the server and the terminal by further hashing the value S(k, i), which has been hashed, with a second hash function J that is shared between the server and the terminal and wherein the server notifies the terminal of the fact that the number of times of hashing operations has been changed after changing the number of times of hashing operations at the server and wherein in case the server makes communication with the terminal, a temporary ID before changing and a temporary ID after the changing which are held in the server are used in succession so as to request the terminal to send a signal to the server; or (B) wherein at each of the server and the terminal, preprocessing related to the number of times of hashing operations i is carried out before hashing i times with the first hash function H, and a value obtained by the preprocessing and hashing with the first hash function H is calculated as the temporary ID, wherein the server notifies the terminal of the fact that the number of times of hashing operations has been changed after changing the number of times of hashing operations at the server and wherein in case the server makes communication with the terminal, a temporary ID before changing and a temporary ID after the changing which are held in the server are used in succession so as to request the terminal to send a signal to the server.

2. A terminal identification method for identifying at least terminal in communication via a network between a server and the terminal, the method comprising:

sharing a first hash function H and an initial value S(k, 0) which is determined for each terminal between the server and the terminal;

calculating a temporary ID at the server and the terminal based on a value S(k, i) which is obtained by hashing the initial value S(k, 0) i times with the first hash function H, or by performing a calculation using the initial value S(k, 0), a parameter i, and the first hash function H; and calculating the same temporary ID at the server and the terminal by setting the same number of times of hashing operations at the server and the terminal to identify the terminal using the temporary ID, (A) wherein the temporary ID is calculated at the server and the terminal by further hashing the value S(k, i), which has been hashed, with a second hash function J that is shared between the server and the terminal and wherein the server notifies the terminal of the fact that the number of times of hashing operations has been changed after changing the number of times of hashing operations at the server and wherein the server notifies the terminal of information indicating the number of times of hashing operations for updating the temporary ID by authenticating the terminal using a terminal authentication key when the terminal makes communication with the server; or (B) wherein at each of the server and the terminal, preprocessing related to the number of times of hashing operations i is carried out before hashing i times with the first hash function H, and a value obtained by the preprocessing and hashing with the first hash function H is calculated as the temporary ID, wherein the server notifies the terminal of the fact that the number of times of hashing operations has been changed after changing the number of times of hashing operations at the server and wherein the server notifies the terminal of information indicating the number of times of hashing operations for updating the temporary ID by authenticating the terminal using a terminal authentication key when the terminal makes communication with the server.

3. A terminal identification method for identifying at least terminal in communication via a network between a server and the terminal, the method comprising:

sharing a first hash function H and an initial value S(k, 0) which is determined for each terminal between the server and the terminal;

calculating a temporary ID at the server and the terminal based on a value S(k, i) which is obtained by hashing the initial value S(k, 0) i times with the first hash function H, or by performing a calculation using the initial value S(k, 0), a parameter i, and the first hash function H; and calculating the same temporary ID at the server and the terminal by setting the same number of times of hashing operations at the server and the terminal to identify the terminal using the temporary ID, (A) wherein the temporary ID is calculated at the server and the terminal by further hashing the value S(k, i), which has been hashed, with a second hash function J that is shared between the server and the terminal and wherein the server notifies the terminal of the fact that the number of times of hashing operations has been changed after changing the number of times of hashing operations at the server and wherein a signal for updating the temporary ID which the terminal has received is reflected to the changing of the temporary ID in the terminal, by authenticating the server using a network authentication key when the server makes communication with the terminal; or (B) wherein at each of the server and the terminal, preprocessing related to the number of times of hashing operations i is carried out before hashing i times with the first hash function H, and a value obtained by the preprocessing and hashing with the first hash function H is calculated as the temporary ID, wherein the server notifies the terminal of the fact that the number of times of hashing operations has been changed after changing the number of times of hashing operations at the server and wherein a signal for updating the temporary ID which the terminal has received is reflected to the changing of the temporary ID in the terminal, by authenticating the server using a network authentication key when the server makes communication with the terminal.

4. A terminal identification method for identifying at least terminal in communication via a network between a server and the terminal, the method comprising:

sharing a first hash function H and an initial value S(k, 0) which is determined for each terminal between the server and the terminal;

calculating a temporary ID at the server and the terminal based on a value S(k, i) which is obtained by hashing the initial value S(k, 0) i times with the first hash function H, or by performing a calculation using the initial value S(k, 0), a parameter i, and the first hash function H; and calculating the same temporary ID at the server and the terminal by setting the same number of times of hashing operations at the server and the terminal to identify the terminal using the temporary ID, (A) wherein the temporary ID is calculated at the server and the terminal by further hashing the value S(k, i), which has been hashed, with a second hash function J that is shared between the server and the terminal and wherein in case the server receives a temporary ID which has been determined in advance between the server and the terminal from the terminal, the server initializes the temporary ID by: generating an initial vector which has a different value every time the initial vector is generated; and calculating the number of times of hashing operations based on the initial vector, the first hash function H, and the initial value S(k, 0); or (B) wherein at each of the server and the terminal, preprocessing related to the number of times of hashing operations i is carried out before hashing i times with the first hash function H, and a value obtained by the preprocessing and hashing with the first hash function H is calculated as the temporary ID and wherein in case the server receives a temporary ID which has been determined in advance between the server and the terminal from the terminal, the server initializes the temporary ID by: generating an initial vector which has a different value every time the initial vector is generated; and calculating the number of times of hashing operations based on the initial vector, the first hash function H, and the initial value S(k, 0); or (C) wherein the temporary ID is calculated at the server and the terminal by further hashing the value S(k, i), which has been hashed, with a second hash function J that is shared between the server and the terminal and wherein the server notifies the terminal of the fact that the number of times of hashing operations has been changed after changing the number of times of hashing operations at the server and wherein in case the server receives a temporary ID which has been determined in advance between the server and the terminal from the terminal, the server initializes the temporary ID by: generating an initial vector which has a different value every time the initial vector is generated; and calculating the number of times of hashing operations based on the initial vector, the first hash function H, and the initial value S(k, 0); or (D) wherein at each of the server and the terminal, preprocessing related to the number of times of hashing operations i is carried out before hashing i times with the first hash function H, and a value obtained by the preprocessing and hashing with the first hash function H is calculated as the temporary ID, wherein the server notifies the terminal of the fact that the number of times of hashing operations has been changed after changing the number of times of hashing operations at the server and wherein in case the server receives a temporary ID which has been determined in advance between the server and the terminal from the terminal, the server initializes the temporary ID by: generating an initial vector which has a different value every time the initial vector is generated; and calculating the number of times of hashing operations based on the initial vector, the first hash function H, and the initial value S(k, 0).

5. The terminal identification method as recited in claim 4, wherein in case the server has initialized the temporary ID, the server notifies the terminal of the initial vector and the number of times of hashing operations, to inform the terminal that the temporary ID has been initialized.

6. The terminal identification method as recited in claim 5, wherein the terminal calculates the temporary ID based on the initial value S(k, 0), the initial vector notified by the server, and the number of times of hashing operations.

7. The terminal identification method as recited in any one of claims 1 to 4, wherein the number of times of hashing operations is changed after performing a predetermined number of times of communications or authentication operations between the server and the terminal, or upon a predetermined period of time has elapsed.

8. The terminal identification method as recited in any one of claims 1 to 4, wherein the server holds a temporary ID before changing, a temporary ID after the changing, and a difference between the number of times of hashing operations before the changing and the number of times of hashing operations after the changing.

9. The terminal identification method as recited in any one of claims 1 to 4, wherein in case the server has received a temporary ID before changing, the server notifies the terminal of a difference between the number of times of hashing operations before the changing and the number of times of hashing operations after the changing so that the terminal updates the temporary ID.

10. The terminal identification method as recited in any one of claims 1 to 4, wherein in case the server has received a temporary ID after changing, a temporary ID before the changing which is held in the server is deleted.

11. The terminal identification method as recited in any one of claims 1 to 4, wherein in case a newly calculated temporary ID conflicts with a temporary ID of another terminal when the server attempts to change the temporary ID, in order to calculate a new temporary ID, the number of times of hashing operations is changed until a temporary ID which does not conflict with the temporary ID of the other terminal is calculated.

12. A server which communicates with a terminal connected therewith via a network, comprising:

a memory unit which holds an initial value S(k, 0) which is identical to an initial value held by the terminal; and a temporary ID calculating unit which calculates a temporary ID based on a value S(k, i) obtained: by applying a hash function H to the initial value S(k, 0) held in the memory unit, the same i times as the number of times of hashing operations at the terminal; or by applying a calculation which is identical to a calculation carried out at the terminal based on the initial value S(k, 0), a parameter i, and the hash function H, wherein the server identifies the terminal using the temporary ID calculated by the temporary ID calculating unit, and (A) wherein the temporary ID is calculated at the server and the terminal by further hashing the value S(k, i), which has been hashed, with a second hash function J that is shared between the server and the terminal and wherein the server notifies the terminal of the fact that the number of times of hashing operations has been changed after changing the number of times of hashing operations at the server and wherein in case the server makes communication with the terminal, a temporary ID before changing and a temporary ID after the changing which are held in the server are used in succession so as to request the terminal to send a signal to the server; or (B) wherein at each of the server and the terminal, preprocessing related to the number of times of hashing operations i is carried out before hashing i times with the first hash function H, and a value obtained by the preprocessing and hashing with the first hash function H is calculated as the temporary ID, wherein the server notifies the terminal of the fact that the number of times of hashing operations has been changed after changing the number of times of hashing operations at the server and wherein in case the server makes communication with the terminal, a temporary ID before changing and a temporary ID after the changing which are held in the server are used in succession so as to request the terminal to send a signal to the server.

13. A method implemented by a program executed by a computer of a server which communicates with a terminal connected therewith via a network, comprising:

a temporary ID calculating step of generating a value $S(k, i)$ obtained by applying a hash function H to an initial value $S(k, 0)$ which is identical to an initial value held by the terminal, the same i times as the number of times of hashing operations at the terminal, or by applying a calculation which is identical to a calculation carried out at the terminal based on the initial value $S(k, 0)$, a parameter i, and the hash function H, and calculating a temporary ID based on the value $S(k, i)$; and a terminal identifying step of identifying the terminal using the temporary ID calculated in the temporary ID calculating step, (A) wherein the temporary ID is calculated at the server and the terminal by further hashing the value $S(k, i)$, which has been hashed, with a second hash function J that is shared between the server and the terminal and wherein the server notifies the terminal of the fact that the number of times of hashing operations has been changed after changing the number of times of hashing operations at the server and wherein in case the server makes communication with the terminal, a temporary ID before changing and a temporary ID after the changing which are held in the server are used in succession so as to request the terminal to send a signal to the server; or (B) wherein at each of the server and the terminal, preprocessing related to the number of times of hashing operations i is carried out before hashing i times with the first hash function H, and a value obtained by the preprocessing and hashing with the first hash function H is calculated as the temporary ID, wherein the server notifies the terminal of the fact that the number of times of hashing operations has been changed after changing the number of times of hashing operations at the server and wherein in case the server makes communication with the terminal, a temporary ID before changing and a temporary ID after the changing which are held in the server are used in succession so as to request the terminal to send a signal to the server.

14. A non-transitory computer-readable recording medium which records the program executed by the computer to implement the method as recited in claim 13.

* * * * *